US006633256B2

(12) United States Patent
Zhdanov et al.

(10) Patent No.: US 6,633,256 B2
(45) Date of Patent: Oct. 14, 2003

(54) METHODS AND SYSTEMS FOR IMPROVEMENT OF MEASUREMENT EFFICIENCY IN SURVEYING

(75) Inventors: Alexey Vladislavovich Zhdanov, Moscow (RU); Javad Ashjaee, Saratoga, CA (US)

(73) Assignee: Topcon GPS LLC, Pleasanton, CA (US)

( * ) Notice: Subject to any disclaimer, the term of this patent is extended or adjusted under 35 U.S.C. 154(b) by 0 days.

(21) Appl. No.: 09/938,781

(22) Filed: Aug. 24, 2001

(65) Prior Publication Data

US 2003/0058164 A1 Mar. 27, 2003

(51) Int. Cl.[7] ............................. G01S 5/02; H04B 7/185
(52) U.S. Cl. .................................. 342/357.17
(58) Field of Search ..................... 342/357.17

(56) References Cited

U.S. PATENT DOCUMENTS

| | | | |
|---|---|---|---|
| 5,512,905 A | 4/1996 | Nichols et al. | 342/357.06 |
| 5,914,685 A | 6/1999 | Kozlov et al. | 342/357.12 |
| 5,929,807 A | 7/1999 | Viney et al. | 342/357.06 |
| 6,052,081 A | 4/2000 | Krasner | 342/357.02 |
| 6,052,083 A | * | 4/2000 | Wilson | 342/357.17 |

OTHER PUBLICATIONS

"Mitigation of multipath in DGPS ground reference stations", by M.S. Braasch, F. van Graas, Proc. of the National Technical Meeting, The Institute of Navigation, San Diego, CA Jan 27–29 1992, pp. 105–114.
"GPS multipath mitigation by antenna movements," B.J.H. van den Brekel, D.J.R. van Nee, Electronics Letter, Dec. 3 1992, Vol 28, No. 25, pp. 2286–2288.
Van Nee, J. Siereveld, P. Fenton and B Townsend, "The Multipath Estimating Delay Lock Loop: Approaching Theoretical Accuracy Limits," Proc. of the IEEE Position, Location and Navigation Symposium, Las Vegas, NV, USA, 1994.
"Understanding GPS: principles and applications". Elliott Kaplan, Artech House, 1996, chapter 8, pp. 364–367, ISBN 0–89006–793–7.
Dai D., Walter T., Comp C,. Tsai Y., Ko P., Enge P., Powell D., "High integrity multipath mitigation techniques for ground reference stations," Proc. of the 1997 Int. Tech. Meeting of the ION, Nashville, TN, 1997, pp. 593–604.
Veitsel V., Zhdanov A., Zhodzishsky M., "The mitigation of multipath errors by strobe correlators in GPS/GLONASS receivers" GPS Solutions, vol. 2, No. 2, Fall 1998), pp. 38–45.

* cited by examiner

Primary Examiner—Theodore M. Blum
(74) Attorney, Agent, or Firm—Sheppard Mullin Richter & Hampton LLP

(57) ABSTRACT

Methods and systems for measuring coordinates of a target, particularly under strong multipath conditions, are described. A satellite navigation system antenna and a tilt sensor are mounted on a range pole, with the sensor at the pole's bottom tip. Signals from the antenna and tilt sensor are provided to a receiver, which computes the antenna's coordinates from the antenna signals, and the pole tips position from the computed coordinates and the tilt data. The operator places the pole tip on the target and swings the pole by hand over an angle sector of 15 degrees while keeping the tip on the target. Height of the target can be computed with a single measurement set, and X-Y coordinates with just three measurement sets. The use of additional measurements reduces errors in the target's coordinates since multipath errors are uncorrelated during movement of the antenna. Vertical alignment of the pole is unnecessary.

60 Claims, 6 Drawing Sheets

Instruction Set #1 which directs the data processor to obtain a number N of one or more measurement sets of measured antenna coordinates and measured parameters (two of r, θ, and φ) of the orientation vector.

Instruction Set #2 which directs the data processor to generate an estimate for at least one of the coordinates of the pivot point from the plurality of measurement sets Instruction Set #3 which directs the data processing system to provide the estimate for the at least one of the coordinates of the pivot point as an estimate for at least one of the coordinates of the target point

COMPUTER-READABLE MEDIUM

FIG. 11

METHODS AND SYSTEMS FOR IMPROVEMENT OF MEASUREMENT EFFICIENCY IN SURVEYING

FIELD OF THE INVENTION

The present invention relates to surveying methods and apparatuses for measuring coordinates of a target point. The methods and apparatuses are based on the signals of satellite radio navigation systems. The invention is especially efficient under strong multipath conditions.

BACKGROUND OF THE INVENTION

Satellite navigation systems include the global positioning system (GPS) and the global orbiting navigation system (GLONASS) and are used to solve a wide variety of tasks that related to determining object position, object velocity, and precise time. Land surveying is an important application of receivers based on satellite navigation systems. Such receivers have a lot of advantages compared to the conventional devices for land surveying. In comparison to conventional surveying devices, satellite-based surveying systems are more responsive, can operate in nearly all types of weather and at all times of the day, and can be used in areas which do not have line-of-sight conditions.

Any measurement procedure is characterized by its efficiency (productivity). In the case of surveying, it is the number of point position measurements that can be made per unit of time within a predetermined accuracy. To improve efficiency, we should reduce the time duration of a single measurement. However at this, it is necessary to simultaneously increase measurement accuracy, because a reduction in the time duration of the single measurement can result in a deterioration in accuracy if special precautions are not used.

Many survey applications require sub-centimeter positioning accuracy, i.e., accuracy to within several millimeters. To achieve this, the receiver, which is often called the "rover", operates in phase differential mode with a base station that has a position known with high accuracy. The coordinate difference between a rover and a base station, which is called the "base vector," can be determined in this mode. For this, we use the satellite carrier phase difference between the base and rover. It can be calculated by processing data sets from the base and rover. Data sets of measurements from the base station are called differential corrections. The rover is placed on a point whose coordinates need to be ascertained, i.e., a target point, while the base station is placed on a point with precisely known coordinates, i.e., a land mark. The receiver antennas are mounted, for instance, on respective tripods.

Knowing the coordinates of the base vector and the base station, it is possible to compute the rover's coordinates by summing the base-station and base vector coordinates together. For computing, one needs to know both the landmark position relative to the phase center of the base antenna and the target point position relative to the phase center of the rover's antenna, since a satellite navigation system can determine a base vector only between the phase centers of the antennas.

To simplify the transformation of the phase center position into target point position (and vice versa, landmark position into phase center position), the phase center of the antenna is usually situated vertically above the landmark or target point using a plumb bob, level vial, or other instruments. In this case, for the transformation we need to know just the difference in height between the antenna's phase center and the corresponding landmark or target point.

However, such a procedure of vertical alignment is time-consuming, and is an acceptable burden only for the base station, not the rover. The base station is usually set up to operate for a long time, while the rover is usually fixed for a short time. For instance, such a procedure as real time kinematic (RTK) surveying usually requires that the minimum possible amount of time be used to set up the rover on target point in order to improve measurement efficiency. In practice, almost all of the time needed for an RTK surveying measurement is spent on this set-up time. As usual, in such cases one employs a range pole with a bubble level vial. The antenna is mounted on top of the range pole, and the bottom pole tip is placed on target point.

We should note that using such an instrument does not provide sub-centimeter accuracy because of the possible trembling of the operator's hand. To reduce this trembling, one can use a bipod which has two extra legs to achieve a stable pole position, but this results in an undesirable increase in the set-up time.

An alternative way is to provide the range pole with a tilt sensor and magnetic sensor (compass) that determines direction of the tilt in the horizontal plane. When processing this sensor data, it is possible to ascertain the direction and amount of the pole's tilt, and to then transform the position of the phase center in the target point (U.S. Pat. No. 5,512,905). However, due to their inherent errors, sensors do not allow the accuracy of transformation to better than 1 to 2 cm when using a two-meter length range pole. Moreover such a device is relatively expensive and complicated. The main source of errors for the tilt sensor is temperature drift of measurements, and for the magnetic sensor, it is both neighboring iron objects and local magnetic anomalies.

There is a possibility of doing without any of the above sensors. It is possible if we process a set of measurements obtained when swinging the pole while keeping contact of the pole tip with the target point (U.S. Pat. No. 5,929,807). As the pole length is constant, all of the measured points will be placed on a sphere with a radius equal to the pole's length. The set of measurements can be processed with the least squares technique (LST) to determine the position of the sphere's center, which will be the position of the target point. This approach provides high accuracy in the height of the target point. But at this, the accuracy of the plane position will be poor (not better than 3 to 4 cm) because of the limited swing angle sector of the pole (tilt angle not greater than 20 degrees). This limitation is connected with the shape of an antenna radiation pattern, because if the tilt is greater than 20 degrees, the signal power at the antenna output is too weak to reliably track satellites having low elevation angles. The limitation is also related to inconvenience for the operator to swing the pole with a greater angle since it makes him bend. Note the angle sector of 90 degrees is needed to reach better accuracy, that is, the antenna should be swept through the range of a semi-sphere. However, this is impossible. So, both considered alternative approaches for the transformation of the phase center position into the position of the target point cannot provide sub-centimeter accuracy.

Another source of coordinate errors are multipath errors arising from the reception of signal replicas along with the line-of-sight signal from the satellite. These replicas are reflected from neighboring objects and have parameters different from line-of-sight signal parameters. The total signal received by the antenna and measured by the receiver will be a combination of the parameters of the line-of-sight signal and the parameters of the multipath signals. Thus, the parameters of the total signal will be different from the parameters of the line-of-sight signal, and there will be a resulting multipath error. This error can be about 1 to 3 cm, depending upon operation conditions. In addition, multipath signals can result in anomaly errors having values much greater than the ones given above.

Under differential mode at short baselines, when baseline length is less than 10 km, the multipath error in the antenna's phase center position becomes prevailing. In reality, using differential mode enables one to eliminate almost totally the majority of position error sources which are related to the satellites (selective availability, ionosphere delay, instability of the satellite clock, inaccuracy of ephemeris information). Error elimination is achieved by their inter-compensation at subtraction, since they are present in the same manner at both the base station and the rover. However, this cannot be said about the multipath error because it is determined by the local environment where the antenna is set up.

Multipath errors affect measurement precision in the following two ways. First, it causes an error in the base vector coordinates, and this prevents one from obtaining sub-centimeter accuracy. Such an error is determined by the carrier phase multipath. Second, the time required to reliably resolve ambiguities (an integer number of carrier wavelengths) increases. Knowing the ambiguities is necessary to compute the base vector coordinates. Not only the carrier phase multipath error but also the code pseudo-range) multipath error impact the ambiguity resolution time. This extra time is especially noticeable for single-frequency navigation receivers.

There are different ways of reducing multipath error. Smoothing methods should be mentioned first of all. Here, already computed base vector coordinates can be subjected to smoothing over a time duration much greater than a correlation interval of the multipath error. Smoothing code measurements with carrier phase can be employed to reduce multipath error on code measurements. (see "Understanding GPS: principles and applications". Elliott Kaplan, Artech House, 1996, chapter 8, pp. 364–367, ISBN 0-89006-793-7). These approaches have, however, a series of limitations and disadvantages, the main one being the necessity of long measurements (ten or more minutes) due to a large correlation interval of multipath error to achieve good smoothing.

There exist techniques based on considering the behavior of in-phase component I that was obtained as a result of the correlation processing for a satellite signal. (Dai D., Walter T., Comp C., Tsai Y., Ko P., Enge P., Powell D., "High integrity multipath mitigation techniques for ground reference stations," Proc. of the 1997 Int. Tech. Meeting of the ION, Nashville, Tenn. 1997, pp. 593–604). The fact is that a reflected signal results in I changing. Then, one can compensate for multipath error if the pseudorange, carrier phase, and component I are co-processed. The main drawbacks of this method are low accuracy and the failure to track changes of the error fast enough.

There are also methods that use building of channel algorithms (tracking systems) taking reflected signals into consideration. The systems with any specially selected shape of the reference signal in tracking system correlators are well known (see Veitsel V., Zhdanov A., Zhodzishsky M., "The mitigation of multipath errors by strobe correlators in GPS/GLONASS receivers" GPS Solutions, Volume 2, Number 2, Fall 1998). Some systems employing several correlators are known as well (see Van Nee, J. Siereveld, P. Fenton and B Townsend, "The Multipath Estimating Delay Lock Loop: Approaching Theoretical Accuracy Limits," Proc. of the IEEE Position, Location and Navigation Symposium, Las Vegas, Nev., USA, 1994). In such systems a combination of the output signals of these correlators is used to track signals. The shape of the reference signal in the first case, and the number of the correlators and their combining rule in the second case are chosen to minimize impact of multipath on measurements.

The main drawback of these systems is an impossibility of multipath suppression at short delays (from 0 to 20 m) of the reflected signal compared to the line-of-sight signal. The reflected signals with such delays often arise when there are reflecting objects near the antenna, for instance, trees, cars, buildings, chimneys, towers, pillars, derricks, and other man-made objects. Such a situation can appear under operation in urban canyons or wooded terrain.

Many techniques of multipath suppression have been described which use antennas with special reception patterns that consider the influence of reflected signals. To mitigate multipath due to signal reflection from the Earth's surface, we can utilize special screens on which the antenna can be mounted. One of the following screen types is typically used: ground-plane (the screen having shape of a flat metal disc), or choke ring (the screen as a disc with concentric rings on it). A choke ring screen provides a higher multipath suppression level than a ground-plane screen, but it inherently has greater weight and size. The main limitation of the "screen" approach is a failure to suppress the reception of multipath signals which are in the upper semi-sphere above the antenna.

To mitigate the multipath signals in the upper semi-sphere above the antenna, it is possible to use a series of space-diversity antennas. The operation principle of such systems is based on the fact that multipath parameters are different in different space points. Having processed a series of signals obtained from the antennas, we can substantially reduce the multipath error. In this case, the more antennas and the more distance at which they are spaced from each other, the better the reduction is. However, overweight and greater sizes can be considered the basic faults of such a system.

Another approach is to use the multipath randomization effect, that is, the effect of averaging the multipath error by moving the antenna in space. Thus, for an antenna mounted on the movable vehicle (e.g., a car), the accuracy of the pseudorange measurements is greatly increased if code observables are smoothed by carrier phase observables (see "Mitigation of multipath in DGPS ground reference stations", by M. S. Braasch, F. van Graas, Proc. of the National Technical Meeting, The Institute of Navigation, San Diego, Calif. Jan 27–29 1992). To obtain the randomization effect for static measuring systems, it is necessary to move the antenna along any determinate closed loop, e.g., a circle, by a mechanical driver (see "GPS multipath mitigation by antenna movements," B. J. H. van den Brekel, D. J. R. van Nee, Electronics Letter, Dec. 3, 1992, Vol 28, No.25—In this paper the driver represents a "rotating hand"). The multipath errors in the pseudorange will be averaged with a narrow bandwidth delay lock loop (DLL). The main drawback of this approach is an insufficient level of multipath mitigation (one cannot use a DLL with too narrow of a bandwidth, otherwise there will be a loss of signal tracking). A secondary drawback is the large weight and size of the antenna movement system.

An objective of the present invention is to develop methods and apparatuses that provide improvement of surveying measurement efficiency by increasing accuracy to the sub-centimeter level and reducing the time of coordinate determination for a target point with satellite navigation systems using more complete suppression (i.e., reduction) of multipath during a short time interval. Another objective of the present invention is to improve the efficiency of the measurement process by providing simultaneous, fast and accurate fixing of a target point related to the phase center of an antenna.

SUMMARY OF THE INVENTION

Broadly stated, the present invention encompasses methods and apparatuses for estimating one or more coordinates of a target point from one or more measurement sets made from a satellite navigation antenna which is mounted to one end of a pole, or other mechanical structural member, with the other end of the pole (or structural member) in contact with the target point. Each measurement set comprises one or more measure antenna coordinates, which may be generated at a given time moment by a global-positioning satellite receiver, and a corresponding value representing the inclination angle of the pole (or structural member) relative to the plumb position axis at the given time moment. The plurality of measurement sets preferably are made with the antenna positioned at different locations around the target point.

One exemplary apparatus embodiment of the present invention comprises an antenna, a navigation receiver which receives differential corrections from a base station, a range pole, and a tilt sensor which measures the angle of the pole axis relative to the plumb-position axis, the latter being collinear with the direction of gravitational pull at the target point. The tilt sensor is placed into a housing which is attached to the pole or which serves as the pole's tip at the pole's first end. The antenna is mounted at the top end of a range pole (its second end) and provides its output to the navigation receiver. The navigation receiver, with the aid of corrections from the base stations, generates measured antenna coordinates for the antenna's phase center which are provided to a data processor. The inclination data from the tilt sensor is also provided to the data processor, and the data processor generates estimates of the target point given a plurality of measured antenna coordinates and inclination angles. In use, an operator places a pole tip on a target point and swings the range pole by hand in different directions over an angle sector of at least 5 degrees relative to the plumb-position axis, and preferably over an angle sector of 15 degrees. As an option, the operator may also rotate the antenna about the axis of the pole. During the swinging operation, the system collects data related to the antenna's position and the inclination angle of the pole. Based on this data and the distance from antenna's phase center to the pole tip (at the target point), the present invention can estimate the height of the target point with one measurement set, and the two planar coordinates with three measurement sets. In typical implementations, each measurement set can be generated in less than 5 seconds, and usually in one second or less. In moving the antenna in this manner, the multipath error in navigation data for different measurement sets is almost uncorrelated, and both the time of ambiguity resolution for carrier phase and coordinate position error of the target point will be decreased. There is no need to vertically align the range pole.

It is possible to generate estimates for the target point coordinates both in post-processing and real time. In the first case, from the beginning one records measurements for the rover and base station, and then performs their processing at a subsequent time. In the second case, a system comprises a radio-modem to receive differential corrections from the base station. The measurement sets may be generated at a periodic rate, and the rover may be configured to iteratively compute the coordinates of the target point in real time as each new measurement set is generated. The accuracy of coordinate computations gradually increases with each new set.

There are a number of advantages to this embodiment. The inclinometer is a small, low-cost unit adapted for use with any conventional range pole and exchanges data with the receiver according to a standard protocol. Such a system is easy to operate and provides fixing of the coordinates of the target point with improved accuracy and reduced measurement time, especially in a multipath environment. This system does not require vertical alignment of the range pole as well.

BRIEF DESCRIPTION OF THE DRAWINGS

FIGS. 7 and 8 show exemplary azimuth angle sensor according to the prior art which are incorporated into structural mechanisms according to the present invention.

FIGS. 10 and 11 show exemplary computer program products according to the present invention.

DETAILED DESCRIPTION OF THE INVENTION

Figure 1:
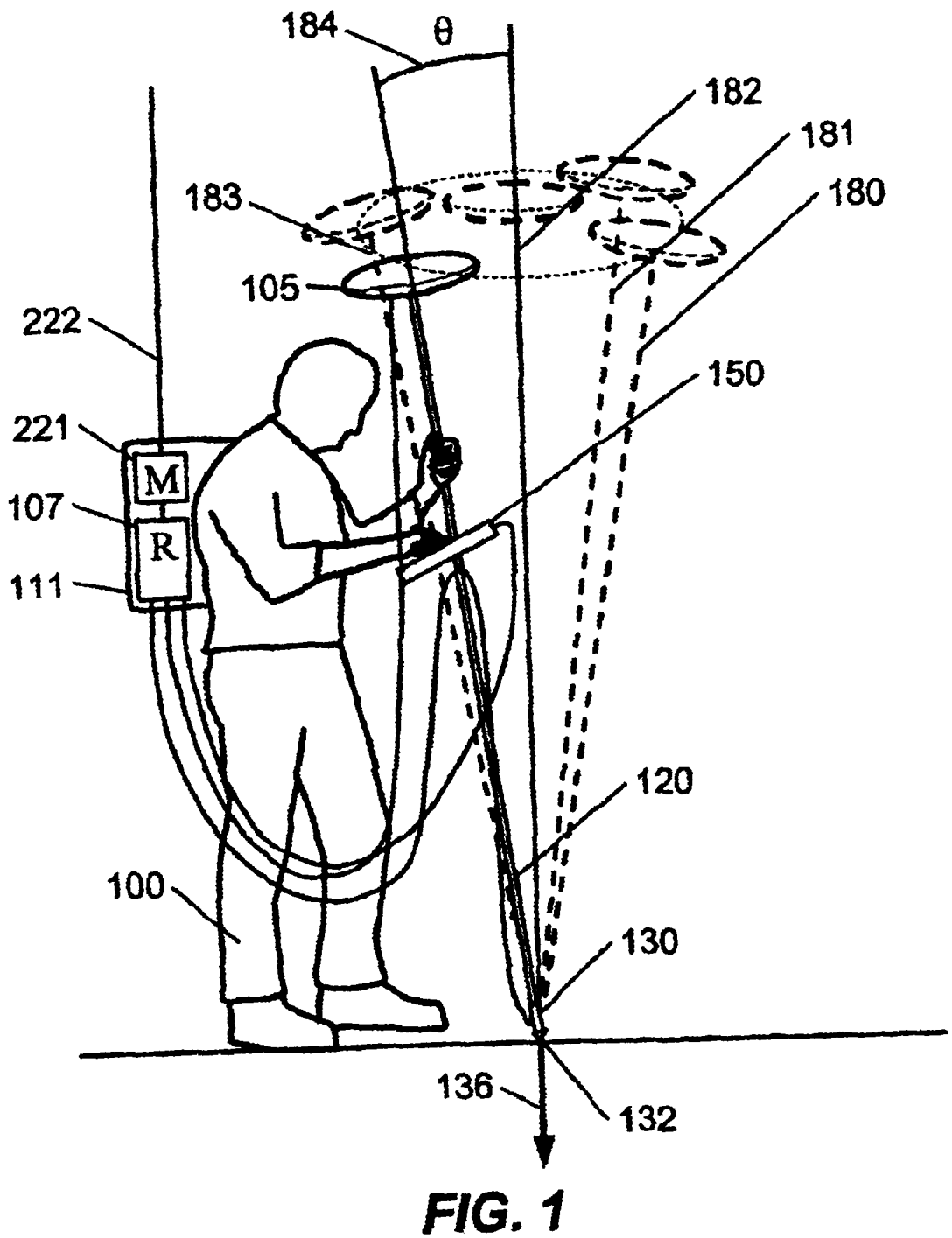
FIG. 1 shows an operator using surveying equipment according to the present invention.

FIG. 1 shows an operator 100 who uses surveying equipment according to a preferred embodiment of the present invention. The equipment comprises an antenna 105 whose signal is provided to a receiver 107 of navigation systems such as GPS and GLONASS. The receiver 107 is usually placed in a backpack 111. The antenna 105 is mounted at the top end of a range pole 120. At the bottom end of the range pole 120 there is an inclinometer 130 having the same housing as the pole tip. The end of the pole tip is placed on a target point 132, whose coordinates are to be estimated within a desired coordinate system. The inclinometer 130 measures an angle θ between a plumb-position axis 182 and the central axis of range pole 120 and outputs a value representative of the angle. Plumb-position axis 182 is collinear with the direction of gravitational pull at the target point. Angle θ is indicated at reference number 134 in the figure. A signal representative of angle θ from the output of the inclinometer 130 is provided to the receiver 107. To operate and obtain an estimate of the target point coordinates, a handheld controller 150 is employed. As described below in greater detail, the operator 100 will swing pole 120 relative to plumb-position axis 182 so that the antenna traces out a range of different positions about the target point.

Figure 2:
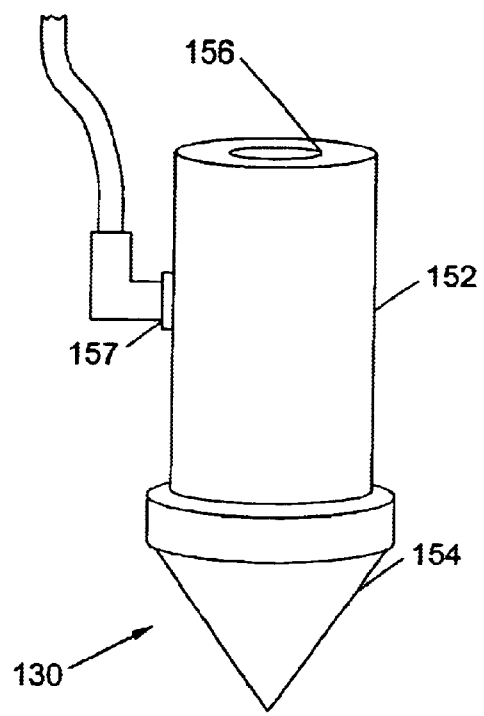
FIG. 2 is a perspective view of a pole tip according to the present invention.

Inclinometer 130 is shown in FIG. 2 in greater detail. Inclinometer comprises a housing which has two parts: a top 152 and a bottom 154. The parts are hollow and connected together by a set of internal screw threads. In addition, there is a standard thread 156 bored into top 152, which is used to attach inclinometer 130 to the bottom end of the range pole 120. To communicate to receiver 107, inclinometer 130 comprises a serial-port connector 157.

Figure 3:
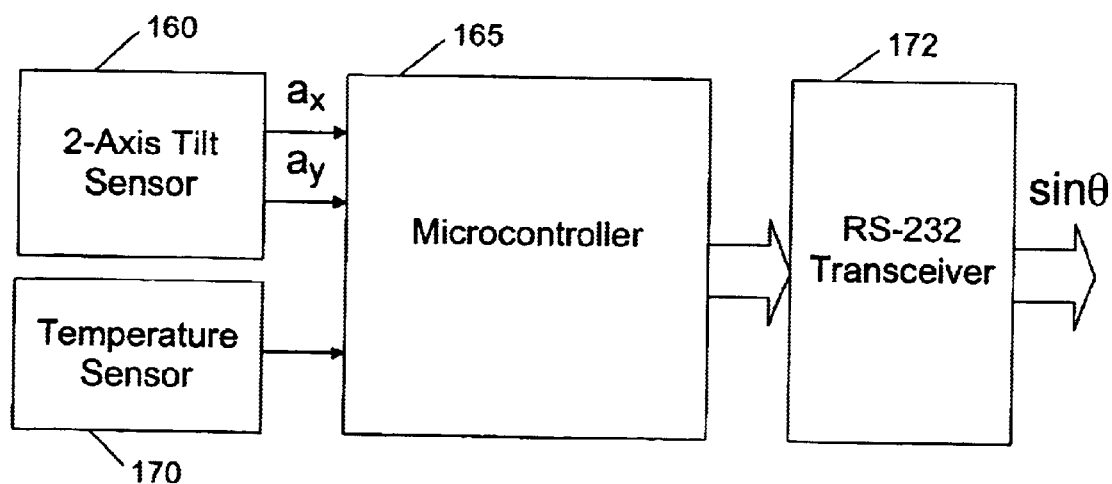
FIG. 3 is a schematic diagram of an inclinometer according the present invention.

A circuit board having a two-axis tilt sensor and a controller is installed inside the inclinometer's housing. FIG. 3 is a schematic diagram of the sensor, shown by reference number 160, and the controller, which comprises a microcontroller 165 and a communication transceiver 172 (e.g., RS-232 transceiver). The output signals from two-axis tilt sensor 160 are coupled to data inputs of microcontroller 165, and a data output of microcontroller 165 is coupled to communications transceiver 172. As an exemplary implementation, sensor 160 may comprise the ADXL-202 chip manufactured by Analog Devices. This chip is an accelerometer that determines the projections of the acceleration vector onto its two internal perpendicular measurement axes x and y and provides the projections as corresponding outputs $\alpha_x$ and $\alpha_y$, respectively. The measured acceleration comprises a dynamic component and a static component. If the dynamic impact upon the accelerometer is sufficiently small (i.e., the accelerometer is nearly stationary), then sensor 160 outputs only the free fall acceleration projections onto the measurement axes. For the ADXL-202 chip, the projection values are given in units of the free-fall acceleration g. Specifically, the sensor outputs are equal to $\alpha_x = \cos\psi_x$ and $\alpha_y = \cos\psi_y$, where $\psi_x$ is the angle between the accelerometer's x-axis and free-fall acceleration vector 136, and where $\psi_y$ is the angle between the accelerometer's y-axis and vector 136.

Chip ADXL-202 is installed into the housing of the inclinometer 130 so that the central axis of range pole 120 is normal to the plane formed by the accelerometer's x and y axes, and preferably installed such that the pole's center axis coincides with a normal drawn from the cross points of the x and y axes. In this case, angle θ is related to $\alpha_x$ and $\alpha_y$ by the following equation:

$$\sin^2\theta = \alpha_x^2 + \alpha_y^2. \qquad [1]$$

Signals $\alpha_x$ and $\alpha_y$ are, however, subject to temperature bias. A preliminary calibration of the tilt sensor 160 in accordance with the signal of a temperature sensor 170 is employed to compensate for this bias. Calibrated values are recorded in the memory of controller 165. During operation the controller 165 reads data from both tilt sensor 160 and temperature sensor 170 and computes the quantity sin θ based upon them. The computed value is then communicated to receiver 107 by way of transceiver 172 and port 157, preferably when requested by receiver 107. It may be appreciated that inclinometer 130 may also output the quantity θ and/or the quantity cos θ in addition to the quantity sin θ, or may output these quantities instead of sin θ. Each quantity is either directly or indirectly representative of the inclination angle θ. It may also be appreciated that the inclination value may be periodically presented at port 157 for receiver 107 to read without generating a request. And while inclinometer 130 is preferably attached to the pole at its bottom tip, it may be appreciated that it may be attached at other areas along the pole, preferably near the bottom end.

Referring back to FIG. 1, navigation signals received by antenna 105 are preliminarily amplified by a low-noise amplifier to compensate for energy losses in the cable that couples antenna 105 to receiver 107. In the receiver 107, the signals are amplified further and converted down to an intermediate frequency level. It should be noted that for multi-system receivers (e.g., GPS and GLONASS) and multi-frequency receivers (e.g., GLONASS), this operation is carried out separately for signals of each system and each frequency in corresponding individual channels. Then, each down-converted signal is digitized, i.e., subject to quantization and sampling. After that, the digital signals are provided to a block of correlation channels, whose main task is to correlate the digitized navigation signals with corresponding reference signals. Each correlation channel of the block correlates one of the down-converted satellite signals with three or four reference signals to produce three or four corresponding correlation signals. Each such reference signal is a multiplication product of a corresponding pseudo-random code signal and a common reference carrier signal for the channel, or the quadrature version of the reference carrier signal. The pseudorandom code signals are generated by respective code generators, and the reference carrier signals are generated by respective carrier numerical controlled oscillators (NCOs). Each correlation channel is assigned to one satellite in view. The pseudorandom code signals and the reference carrier signal for each channel are selected according to the identification number of the satellite to which the channel is assigned. GPS satellites use the same carrier frequency, but have different pseudorandom codes; GLONASS satellites have the same pseudorandom code, but use different carrier frequencies. The correlator block is typically integrated onto a semiconductor chip, namely, an applications specific integrated circuit (ASIC), which typically includes other components as well. Similarly, the code generators and NCOs are integrated on one or more ASIC chips, and are preferably integrated on a single ASIC chip, which may also include the correlator block.

The correlation signals of each correlation channel are transferred to a corresponding tracking channel built in firmware of the microprocessor of the receiver 107. Each firmware tracking channel comprises a delay-lock loop (DLL) which controls the delay of the code generators, and a phase-lock loop (PLL) which controls the phase of the NCO. The PLL controls the NCO so that the phase of the NCO's carrier signal tracks the phase of the carrier of the down-converted satellite signal assigned to the corresponding correlator channel. The PLL has a control bandwidth typically around 20 Hz. The DLL controls the delay of the pseudorandom code signal so that it tracks the delay of the pseudorandom code signal present within the down-converted satellite signal. The DLL has a narrow control bandwidth for high noise immunity, typically around 1 Hz. To enable the code generators to react to fast changes in the delay of the down-converted pseudorandom code signal, the control signal to the code generator is formed from both the control signal of the DLL (which is slow reacting) and the control signal for the PLL (which is fast reacting). This procedure is called guiding. The above receiver constructions are well known to the art and do not form a part of the present invention.

Carrier phase and pseudorange are generated by integrating the PLL and DLL control signals, respectively. In addition, the ephemeris data required for the computation of the satellite coordinates is obtained by demodulating the 50 Hz binary symbols signal. The receiver 107 generates both carrier phase and pseudorange samples for satellites of the current constellation at time moments, which occur with a frequency of 1 to 5 Hz. At the same time moments, the inclinometer 130 is sampled to obtain a value representative of angle θ.

A pseudorange is a sum of a distance between a receiver and a satellite and a receiver clock offset with respect to the global system time. Based on the pseudoranges for at least four satellites and their current coordinates, the microprocessor computes the receiver's stand-alone coordinates (as measured at the phase center of the antenna) and the receiver's clock offset. Such computations are well known to the art and do not form a part of the present invention.

To obtain more precise coordinates, we use the signal carrier phases, which can be much more accurately measured compared to the pseudoranges. In this case, the receiver (rover) operates in differential mode. In such a mode, differential corrections, i.e., pseudoranges and carrier phases that were ascertained at the base station, are employed to compute the coordinates of the rover. From this information, the difference between the navigation measurements of the rover and base station is ascertained. However, the carrier phase differences contain ambiguities, which are unknown integer numbers of carrier cycles. Any number of known procedures of ambiguity resolution using pseudorange differences may then be used to provide a set of unambiguous phase measurements. The rover coordinates are then computed with those unambiguous phase measurements. The generation of coordinates in differential mode is well known in the art and does not form a part of the present invention. For the benefit of the reader who is untrained in the field of linear algebra, the books entitled "Understanding GPS: principles and applications" by Elliott Kaplan, Artech House, 1996 (ISBN 0-89006-793-7) (Chapter 2 and 8) and "Linear algebra, geodesy, and GPS" by Gilbert Strang, Wellesley-Cambridge Press, 1997 (ISBN 0-9614088-6-3) (Chapter 14 and 15) are good tutorial references on the subject of computing stand-alone position, ambiguity resolution, and calculating carrier phase differential coordinates. All methods described there are applicable to the present invention, but are not part of it.

As is known in the art, each coordinate for a three-dimensional space comprises three independent bases, each of which may typically be an axis, a radius from a point or an axis, or a rotation angle about a point or an axis. In general, the computation of the rover's antenna coordinates and resolution of the carrier-phase ambiguities are done within the Earth-Centered Earth-Fixed (ECEF) coordinate system, with the final results being converted to corresponding coordinates in the geodetic coordinate system (latitude, longitude, and height over a predefined ellipsoid model of the Earth, WGS-84). In differential mode, measured antenna coordinates are often converted to corresponding coordinates in the topocentric horizontal coordinate system defined relative to a reference point. A topocentric horizontal coordinate system comprises a Cartesian coordinate system (three orthogonal axes as the three bases) with the origin located near a point of interest, with the X-axis typically directed to the East, the Y-axis directed to the North, and the Z-axis directed upwards. Methods for converting between the various coordinate systems are well known to the art and do not form a part of the present invention.

Referring to FIG. 1, the method and apparatus according to the present invention may be implemented in a post-processing mode where the satellite pseudorange data, carrier phase data, inclination data, and system time (according to the receiver's clock) for a plurality of time moments are recorded in a memory during the surveying process. At a later time, the recorded data is processed with the satellite pseudorange data and carrier phase data collected and stored by the base station at approximately the same plurality of time moments to determine the measured coordinates of the antenna's phase center at those time moments. With the measured antenna coordinates so determined, they may be processed with the inclination data according to the present invention to estimate one or more coordinates of the target point. In the post-processing mode, receiver 107 collects and stores the satellite pseudorange data, the carrier phase data, and the inclination data occurring at a plurality of time moments, along with the time value of the time moments. Controller 150 provides an interface with the operator to begin and end the collection process and the storage of data, and enables the operator to store a text identifier of the target point at which the data is collected. At the post-processing stage, a data-processor, herein called the "coordinates processor," processes the stored psuedorange data and stored carrier phase data from both the rover and base stations to determine measured antenna coordinates. The coordinates processor undertakes a procedure of resolving the ambiguities in the carrier phase data, which is usually an iterative process done over several time moments. The coordinates processor may be part of receiver 107 and may interface with the base station to receive its stored data, or it may be part of the base station and may interface with the rover to receive its data, or it may be a stand-alone component which interfaces with both the base and rover stations to receive their stored data. Once the coordinates processor has determined the measured antenna coordinates at one or more time moments, a data processor operating according to the present invention can start to generate an estimate of one or more of the coordinates of the target point from the measured antenna coordinates and the stored inclination data. This data processor may be the same as the coordinates processor, or may be separate.

The method and apparatus according to the present invention may also be implemented in a real time environment where the coordinates processor, which is preferably located within receiver 107, determines the coordinate values of the antenna's phase center in real time. In this implementation, the survey apparatus comprises a radio-modem 221 having a corresponding antenna 222 to receive the base station's transmissions of its satellite pseudorange data and satellite carrier phase data. Radio-modem 221, like the receiver 107, is usually placed in a backpack 111. This received data is provided to the coordinates processor. As in the post-processing implementation, the coordinates processor undertakes a procedure of resolving the ambiguities in the carrier phase data. Once the coordinates processor has determined the measured antenna coordinates at one or more time moments, a data processor operating according to the present invention can start to generate an estimate of one or more of the coordinates of the target point from the measured antenna coordinates and the stored inclination data. The estimate of the target point's coordinates may be displayed on a screen of controller 150. This data processor may be the same as the coordinates processor, or may be separate. In the latter case, the data processor may be located within controller 150, and the data cable from inclinometer 130 may be directly routed to controller 150.

Figure 5:
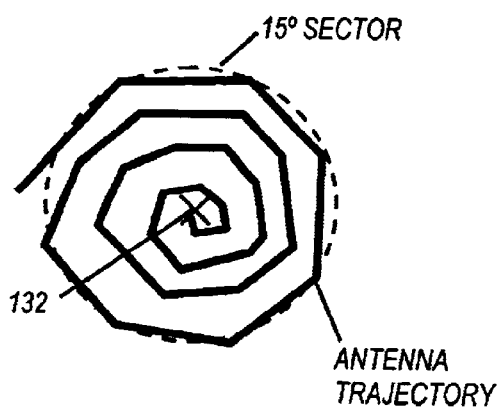
FIGS. 5 and 6 show top plan views of exemplary swinging operations according to the present invention.
Figure 6:
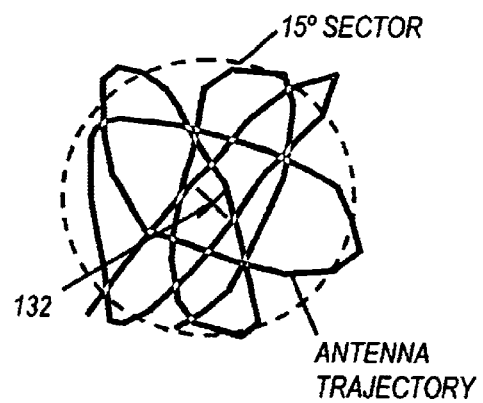

According to the present invention, the operator 100 starts swinging the range pole 120 by hand in different directions preferably over an angle sector of approximately 15 degrees, while preferably simultaneously rotating the pole 360-degrees around the pole's central axis. Examples of the first motion (swinging in different directions) are shown in FIGS. 5 and 6, which show overhead views of the area around target point 132.

Swinging the range pole 120 results in the fact that navigation data for different measurement sets will be related to various points in space where the multipath error will differ. Therefore, the multipath error in the navigation data of different measurement sets can be almost uncorrelated. Moreover, multipath error randomization will be present within each pseudorange itself, the latter due to averaging of the error by the narrow-bandwidth guided DLL which tracks and measures the pseudorange.

Rotating the antenna about the pole's central axis enables one to also average the error in the determination of the angle θ. This error is a result of both the inaccuracy in calibrating the tilt sensor 160 and the axial flexure of the range pole 120. As a further benefit, rotation reduces the offset error in the antenna's phase center, as measured in the horizontal plane from the pole's central axis. The latter eliminates the requirement of using a zero-centered antenna, that is an antenna with phase center offset close to zero, for the rover's antenna. Such an antenna is made by special technology and costs much more than a conventional one.

As an example, FIG. 1 shows some instantaneous positions 180–183 of the range pole 120 during swinging. As the inclinometer 130 is mounted at the bottom end of the range pole 120, dynamic acceleration arising from the swinging motion does not impact the operation of tilt sensor 160. Moreover, centripetal acceleration caused by the pole's central axis rotation also does not influence the tilt sensor 160 since the tilt sensor 160 is placed on the central axis of the range pole 120.

Let us consider a procedure of determining coordinates $(x_t, y_t, z_t)$ of a target point 132 given in the topocentric horizontal coordinate system XYZ, whose origin is located near to the target point 132. Axis X is directed to the East, axis Y is directed to the North, and axis Z is directed upward.

The phase center coordinates of the antenna 105 in system XYZ for the i-th measurement set at the i-th time moment are designated as $(x_{ai}, y_{ai}, z_{ai})$. In one embodiment according to the present invention, the ambiguities in the navigation data are resolved and the carrier phase differential coordinates $(x_{ai}, y_{ai}, z_{ai})$ are computed. It should be noted that the resolution time in processing several measurement sets of navigation data is reduced due to multipath randomization (the necessary number of sets is decreased), resulting in faster computing of coordinates $(x_{ai}, y_{ai}, z_{ai})$ and thus $(x_t, y_t, z_t)$. Note that strong multipath conditions result in increasing the number of measurement sets needed to resolve the ambiguities, and thus an instantaneous solution (using one measurement set) is not possible in strong multipath conditions.

The origin of the topocentric system XYZ is near target point 132 so that the Z-axis will be parallel to plumb-position axis 182 and gravitation free-fall vector 136. Then, range pole 120 can be considered as a radius-vector with the origin $(x_t, y_t, z_t)$ and the end point $(x_{ai}, y_{ai}, z_{ai})$. In the Cartesian coordinate system, this radius-vector is defined by the coordinates $(x_{ai}-x_t, y_{ai}-y_t, z_{ai}-z_t)$. In a spherical coordinate system, the radius-vector has a length r that is equal to a distance between the pole tip and antenna phase center. At the i-th time moment, it has an azimuth $\phi_i$ and angle $\theta_i$ measured by the inclinometer 130.

With the help of relationship equations which map points between the Cartesian and spherical coordinate systems, we can obtain the following relationships:

$$x_{ai}-x_t = r \sin \theta_i \cos \phi_i; \quad [2]$$

$$y_{ai}-y_t = r \sin \theta_i \sin \phi_i; \quad [3]$$

$$z_{ai}-z_t = r \cos \theta_i;\ i=1 \ldots N. \quad [4]$$

It is possible to obtain a height estimate $z_t$ by the end of the first measurement set as follows: $z_t = z_{a1} - r \cos \theta_1$, using one measurement set. One may also receive several measurement sets of measured antenna coordinates and pole inclination angles, and then select one of the sets of measured data to generate $z_t = z_{aS} - r \cos \theta_S$, where the subscript "S" denotes the number of the selected set of measurements from the selected time moment. Having N measurement sets, a mean value over all sets can be generated to obtain an estimate $z_t$ as follows:

$$z_t = E\{z_{ai} - r \cos \theta_i\},\ i=1 \ldots N, \quad [5]$$

where E {} is the mean value operator. An advantage of using a plurality of N measurement sets, such as two or more, is a reduction in the errors caused by multipath signals compared to the case where data from only one measurement set is used. One may thereafter receive a number M of one or more additional measurement sets at M corresponding time moments, and generate a revised estimated value $z_{t,rev}$ of the estimated Z-axis coordinate $z_t$ according to a form which is equivalent to:

$$z_{t,rev} = E\{N \cdot z_t, z_{aj} - r \cos \theta_j\},\ j=1 \ldots M, \quad [5A]$$

where E{} is the mean value operator, j is an index over the additional measurement sets, $z_{aj}$ is the measured Z-axis antenna coordinate of the j-th additional measurement set, and where $\theta_j$ is the pole inclination angle of the j-th additional measurement set. This is particularly useful when operating in real-time mode.

Whether $z_t$ or $z_{t,rev}$ is generated, it is provided as an estimate for the Z-axis coordinate of the target point since the pole's first end is in contact with the target point.

As to generating estimates for the other coordinates of the target point, the azimuth angles $\phi_i$ present in equations [2] and [3] for the plane coordinates $x_t$ and $y_t$ are unknown, but can be estimated once $x_t$ and $y_t$ are estimated. To generate an estimate for $(x_t, y_t)$, and also implicitly for each $\phi_i$, we can solve the following exemplary system of equations:

$$x_{a1} - x_t = r\sin\theta_1 \cos\varphi_1; \quad [6]$$
$$y_{a1} - y_t = r\sin\theta_1 \sin\varphi_1;$$
$$x_{a2} - x_t = r\sin\theta_2 \cos\varphi_2;$$
$$y_{a2} - y_t = r\sin\theta_2 \sin\varphi_2;$$
$$\vdots$$
$$x_{aN} - x_t = r\sin\theta_N \cos\varphi_N;$$
$$y_{aN} - y_t = r\sin\theta_N \sin\varphi_N;$$

Figure 4:
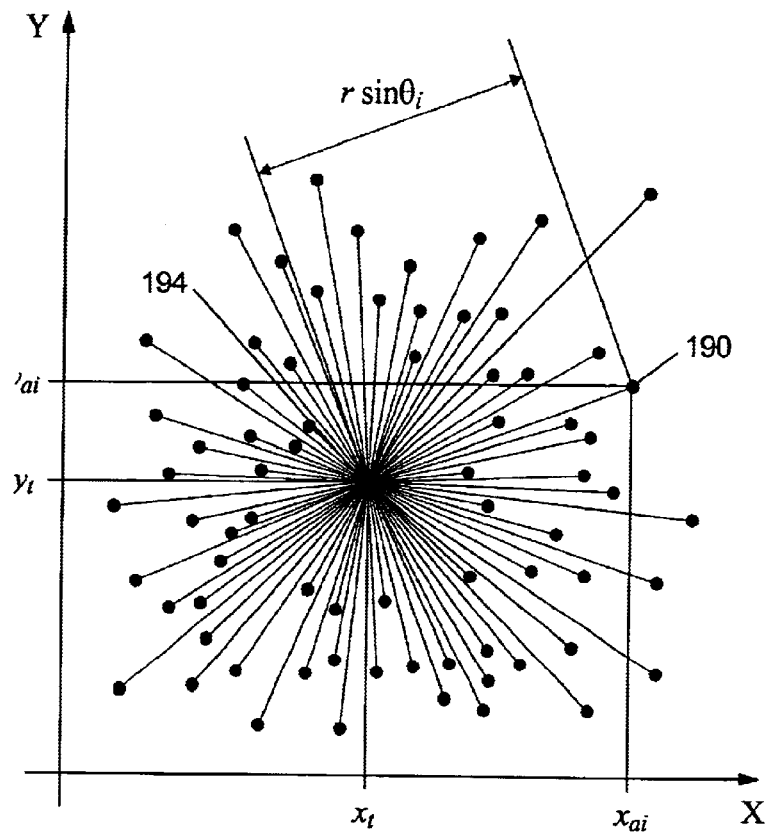
FIG. 4 represents a series of an antenna's positions in a horizontal plane during a swinging of the range pole according to the present invention.

This system is written for N measurement sets made at N corresponding time moments. At least three measurement sets (N=3) are required to compute an estimate for $(x_t, y_t)$. Using data from three or more measurement sets and at three or more corresponding well-placed positions of the antenna reduces the errors caused by multipath signals with respect to the case where the position of the target point is determined from one measurement with the antenna positioning directly over the target point. Note that at N=2, it is possible to obtain an estimate as well, but such a solution will be ambiguous (the system has two solutions). A geometric interpretation of the system solution is presented in FIG. 4. A series of randomly located positions of the phase center of the antenna 105 in horizontal plane XY for N measurement sets are shown as points in the figure. Let any i-th point 190 be represented by the coordinates ($x_{ai}$, $y_{ai}$). The task is to find such a point 194 with coordinates ($x_t$, $y_t$) that is a distance of $r \sin \theta_i$ from each of the N points. These distances are shown in FIG. 4 as thin lines radiated from a point 194 at ($x_t$, $y_t$).

The considered system of equations [6] is nonlinear. The Azimuth angles $\phi_i$ may be eliminated from each pair of equations:

$$x_{ai} - x_t = r \sin \theta_i \cos \phi_i$$

$$y_{ai} - y_t = r \sin \theta_i \sin \phi_i$$

by squaring each of the equations and then adding them together to obtain the following combined equation:

$$(x_{ai}-x_t)^2 + (y_{ai}-y_t)^2 = (r \sin \theta_i)^2 (\sin^2 \phi_i + \cos^2 \phi_i). \quad [7]$$

Because $\sin^2 \phi_i + \cos^2 \phi_i = 1$ for all values of $\phi_i$, the combined equation may be reduced as follows:

$$(x_{ai}-x_t)^2 + (y_{ai}-y_t)^2 = (r \sin \theta_i)^2, \quad [8]$$

which is mathematically equivalent to:

$$(x_{ai}-x_t)^2 + (y_{ai}-y_t)^2 - (r \sin \theta_i)^2 = 0, \quad [8A]$$

and mathematically equivalent to:

$$\frac{(x_{ai}-x_t)^2}{r^2} + \frac{(y_{ai}-x_t)^2}{r^2} - (\sin \theta_i)^2 = 0, \quad [8B]$$

and mathematically equivalent to:

$$\frac{(x_{ai}-x_t)^2}{r^2} + \frac{(y_{ai}-x_t)^2}{r^2} - 1 + (\cos \theta_i)^2 = 0, \quad [8C]$$

as well as additional mathematically equivalent forms. Equation [8] may also be mathematically equivalently reduced to:

$$\{(x_{ai}-x_t)^2 + (y_{ai}-y_t)^2\}^{1/2} = r \sin \theta_i, \quad [9]$$

which is mathematically equivalent to:

$$\{(x_{ai}-x_t)^2 + (y_{ai}-y_t)^2\}^{1/2} - r \sin \theta_i = 0, \quad [9A]$$

and mathematically equivalent to:

$$\frac{1}{r} \cdot \sqrt{(x_{ai}-x_t)^2 + (y_{ai}-y_t)^2} - \sin \theta_i = 0, \quad [9B]$$

and mathematically equivalent to:

$$\arcsin\left(\frac{1}{r} \cdot \sqrt{(x_{ai}-x_t)^2 + (y_{ai}-y_t)^2}\right) - \theta_i = 0, \quad [9C]$$

as well as additional mathematically equivalent forms.

When each of equations [8]–[8C] and [9]–[9C], or the equivalents thereof, is applied to the specific measured antenna coordinates $x_{ai}$ and $y_{ai}$ and inclination value $\theta_i$ from a particular measurement set, it provides a relationship which describes a locus (i.e., a set) of estimated points in the X-Y plane for the coordinates $x_t$ and $y_t$ of the pole's first end. The locus comprises a circle of points, each such point being a potential estimate for $x_t$ and $y_t$. The locus of points has the following significance. If we draw a line from the point located at the measured antenna coordinates ($x_{ai}$, $y_{ai}$, $z_{ai}$) to any point on the locus which is a distance r from the measured antenna coordinates, the inclination angle of that line will be the same as the measured inclination angle $\theta_i$. In fact, the locus have the following more general meaning: If we draw a line from a point located at the first two measured antenna coordinates ($x_{ai}$, $y_{ai}$), with third coordinate $z_{ai}$ set at any arbitrary value, to any point on the locus which is a distance r from the measured antenna coordinates, the inclination angle of that line will be the same as the measured inclination angle $\theta_i$. (The grouping of one or more of the measured antenna coordinates $x_{ai}$, $y_{ai}$, and $z_{ai}$ with the measured inclination value $\theta_i$ for a particular time moment is referred to herein as a measurement set, for the ease of description and claiming). In an ideal setting without any sources of noise, two such loci provided from two different relationships will either intersect at two points, which represent two possible estimated points for $x_t$ and $y_t$, or they will intersect at one point. The latter situation is rare, and occurs when the Azimuth angles $\phi_1$ and $\phi_2$ for the two measured antenna positions differ by 180°. With noise source present, the two loci may not intersect at all when the difference between the Azimuth angles $\phi_1$ and $\phi_2$ is near or at 180°.

A simplistic way of generating estimates for $x_t$ and $y_t$ is to have the operator obtain two measurements which have each of their inclination angles $\theta_1$ and $\theta_2$ at values around 15° and have the difference between their azimuth angles $\phi_1$ and $\phi_2$ at a value around 90°, and determine therefrom the two points where the two corresponding loci intersect. One can then have the operator obtain a third antenna measurement made at an inclination angle of around 0°, and can then find the estimates for $x_t$ and $y_t$ by selecting the intersection point which is closest to the third antenna measurement as the estimates for $x_t$ and $y_t$. The two intersecting points may be found, for example, by writing two versions of equation [8], one for each of the two initial measurements, and then subtracting the two versions to eliminate the squared terms $x_t^2$ and $y_t^2$, which a linear equation involving $x_t$ and $y_t$. The linear equation may then be solved for $y_t$ and then substituted into one of the versions of equation [8] to find $x_t$. The estimate for $y_t$ may be found by using the found value of $x_t$ in the linear equation or either of the versions of equation [8].

The above simplistic method, however, does not take advantage of averaging over many measurement sets, such as improved accuracy through the cancellation of zero-mean noise sources and the reduction of multipath effects. One can apply the above simplistic method to several pairs of measurements and average the results over many such measurements. However, a more convenient way of averaging over several measurement sets is to perform a non-linear least-squares fitting of the estimated coordinates $x_t$ and $y_t$ to a set of N equations formed by applying equation 8 (or any of the other equations 8A–8C, 9, 9A–9C and equivalents thereof) to a number N of measurement sets. While these equations are mathematically equivalent in terms of defining the loci for the relationships, the inventors have discovered that the use of equation [9] enables many non-linear least squares-fitting processes to generate estimates which have smaller errors when operating on real-world data, and thus the use of equation [9] is currently preferred by the inventors. Several non-linear least-squares fitting processes are known to the art, and may be used. In preferred embodiments of the present invention, Newton's method is applied to the set of non-linear equations 8 (or any of the other equations 8A–8C, 9, 9A–9C and equivalents thereof). The form of the method may be recursively defined by the equation:

$$X_{k+1} = X_k - \left( H'_k H_k + \sum_{i=1}^{N} m_k[i] G_{k_i} \right)^{-1} H'_k M_k \quad [10]$$

where the index "k" denotes the present recursive iteration and the index "k+1" denotes the next recursive iteration;

$X_k$ is the present estimated value of the unknowns $x_t$ and $y_t$, $$X_k = \begin{pmatrix} x_{t_k} \\ y_{t_k} \end{pmatrix},$$

and $X_{k+1}$ is the next set of estimated values of the unknowns $x_t$ and $y_t$ which is being generated by the application of equation [10];

$M_k$ is an N-by-1 vector of difference quantities, with each i-th quantity being equal to or proportional to the difference between the left and right sides of equation [8] (or any of the other equations 8A–8C, 9, 9A–9C and equivalents thereof) as applied to the i-th measurement set, or an equivalent thereof, for the k-th recursion, with the iteration values $x_{t,k}$ and $y_{t,k}$ being used in the equation in place of the estimated coordinates $x_t$ and $y_t$;

$H_k$ is an N-by-2 matrix and is the first partial derivative matrix, or Jacobian, of vector $M_k$ for the k-th recursion;

$G_{ki}$ is a 2-by-2 matrix and is the second partial derivatives matrix of the i-th component of vector $M_k$ for the k-th recursion;

$m_k[i]$ is the i-th element of vector $M_k$;

$( )^{-1}$ indicates matrix inversion; and $( )'$ indicates matrix transposition.

As indicated above, each component of $M_k$ may be proportional to the difference between the left and right sides of the equation rather than being strictly equal to the difference. As an example, each difference for a component of $M_k$ may be multiplied by a weighting coefficient which is reflective of the estimated accuracy of measured antenna components that were used to construct the difference quantity and/or the accuracy of the measured inclination angle.

To start the iteration process, one selects an initial value for $X_k=(x_{t,k}, y_{t,k})$ for k=0, and then recursively applies equation [10] for succeeding values of k=1, 2, ... to obtain succeeding estimates $X_{k+1}$ for each value of k. Each application of equation [10] is generally referred to as an iteration, and more specifically referred to as a recursion. The mean value of the x-measurements $x_{ai}$ may be used for an initial value for $x_{t,k}(k=0)$, and the mean value of the y-measurements $y_{ai}$ may be used for an initial value for $y_{t,k}(k=0)$:

$$X_0 = \begin{pmatrix} E\{x_{ai}\} \\ E\{y_{ai}\} \end{pmatrix}, \quad i = 1 \ldots N.$$

Once $X_{k+1}$ has been computed, the next iteration is started by replacing the components of $X_{k+1}$ with the components $X_k$, which effectively increments index k by one in the recursion, followed by recomputing the components of $M_k$, $H_k$, and $G_k$. While it is most preferred that both components of $X_{k+1}$ be replaced with the components of $X_k$ to start the next iteration, one may use a less preferred approach of replacing only one of the components, such as replacing $x_{t,k}$ for the start of even-numbered iterations and $y_{t,k}$ for the start of odd numbered iterations. After a few iterations have moved $X_k$ close to the final solution point, the components of $H_k$ and $G_k$ usually do not substantially change during the succeeding iterations, and thus the prior versions of these matrices may be used in the succeeding iterations.

With each iteration, the difference between consecutive values $X_{k+1}$ and $X_k$, which is denoted herein as $\delta x_k = X_{k+1} - X_k$, becomes smaller until it reaches a limiting value near zero. This difference is usually measured by a norm of the vector $\delta x_k$, which is typically the L-2 norm: $\|\delta x_k\|_2 = (\delta x_k' \cdot \delta x_k)^{1/2}$, where $\delta x_k'$ is the transpose of vector $\delta x_k$. During the iterations, the L-2 norm of the difference quantities $M_k$, $\|M_k\|_2 = (M_k' \cdot M_k)^{1/2}$, also decreases. Succeeding iterations are performed until the norm of $M_k$ decreases to a desired level or the lowest possible value, and/or the norm of $\delta x_k$ decreases to a desired level or the lowest possible value. Once the final desired accuracy of $X_{k+1}$ is obtained, the components of $X_{k+1}$ are provided as the estimated coordinates of the target point since the bottom tip of the range pole is in contact with the target point and is, therefore, substantially the same point.

When applying equation [10] to the form of equation [8A], $M_k$, $H_k$, and $G_{ki}$ may have the forms of:

$$M_k = \begin{pmatrix} (x_{a1} - x_{t_k})^2 + (y_{a1} - y_{t_k})^2 - (r\sin\theta_1)^2 \\ (x_{a2} - x_{t_k})^2 + (y_{a2} - y_{t_k})^2 - (r\sin\theta_2)^2 \\ \vdots \\ (x_{aN} - x_{t_k})^2 + (y_{aN} - y_{t_k})^2 - (r\sin\theta_N)^2 \end{pmatrix}, \quad [11]$$

$$H_k = \begin{pmatrix} -2(x_{a1} - x_{t_k}) & -2(y_{a1} - y_{t_k}) \\ -2(x_{a2} - x_{t_k}) & -2(y_{a2} - y_{t_k}) \\ \vdots & \vdots \\ -2(x_{aN} - x_{t_k}) & -2(y_{aN} - y_{t_k}) \end{pmatrix}, \quad [12]$$

$$G_{ki} = \begin{pmatrix} 2 & 0 \\ 0 & 2 \end{pmatrix} \text{ for all } i, \quad [13]$$

or equivalents thereof. When applying equation [10] to the form of equation [9A], $M_k$, $H_k$, and $G_{ki}$ may have the forms of:

$$M_k = \begin{pmatrix} \sqrt{(x_{a1} - x_{t_k})^2 + (y_{a1} - y_{t_k})^2} - r\sin\theta_1 \\ \sqrt{(x_{a2} - x_{t_k})^2 + (y_{a2} - y_{t_k})^2} - r\sin\theta_2 \\ \ldots \\ \sqrt{(x_{aN} - x_{t_k})^2 + (y_{aN} - y_{t_k})^2} - r\sin\theta_N \end{pmatrix}, \quad [14]$$

-continued $$H_k = \begin{pmatrix} \dfrac{-(x_{a1}-x_{t_k})}{\sqrt{(x_{a1}-x_{t_k})^2+(y_{a1}-y_{t_k})^2}} & \dfrac{-(y_{a1}-y_{t_k})}{\sqrt{(x_{a1}-x_{t_k})^2+(y_{a1}-y_{t_k})^2}} \\ \dfrac{-(x_{a2}-x_{t_k})}{\sqrt{(x_{a2}-x_{t_k})^2+(y_{a2}-y_{t_k})^2}} & \dfrac{-(y_{a2}-y_{t_k})}{\sqrt{(x_{a2}-x_{t_k})^2+(y_{a2}-y_{t_k})^2}} \\ \vdots & \vdots \\ \dfrac{-(x_{aN}-x_{t_k})}{\sqrt{(x_{aN}-x_{t_k})^2+(y_{aN}-y_{t_k})^2}} & \dfrac{-(y_{aN}-y_{t_k})}{\sqrt{(x_{aN}-x_{t_k})^2+(y_{aN}-y_{t_k})^2}} \end{pmatrix}$$ [15]

$$G_{k_i} = \frac{1}{D}\begin{pmatrix} (y_{ai}-y_{t_k})^2 & -(y_{ai}-y_{t_k})(x_{ai}-x_{t_k}) \\ -(y_{ai}-y_{t_k})(x_{ai}-x_{t_k}) & (x_{ai}-x_{t_k})^2 \end{pmatrix}$$ [16]

where $D = \left(\sqrt{(x_{ai}-x_{t_k})^2+(y_{ai}-y_{t_k})^2}\right)^3$

Using this equation we can compute the estimate $(x_t, y_t)$ during several recursions. As the multipath error in the different space points (and correspondingly, in various measurement sets) is almost uncorrelated, the error in the coordinates $(x_t, y_t, z_t)$ will be averaged, since coordinates were computed by data set over all measurement sets.

It may be appreciated that the following simplified form of equation [10] may be used in place of equation [10]:

$$X_{k+1} = X_k - (H_k'H_k)^{-1}H_k'M_k,$$ [17]

which does not use the second partial derivatives. However, equation [17] usually has slower convergence rates than equation [10].

It may be appreciated that the above recursion-iteration processes may add one or more additional measurement sets at the start of each iteration by expanding vector $M_k$ to include an additional difference quantity for each additional measurement set, and by expanding matrix $H_k$ and and forming additional second-derivative matrices $G_{ki}$ to reflect the added components of $M_k$.

The above methods of estimating the coordinates of the target point are preferably implemented by a data processing system, such as a microcomputer, operating under the direction of a set of instructions stored in computer-readable medium, such as ROM, RAM, magnetic tape, magnetic disk, etc. This data processor may be in addition to the coordinates processor which generates the measured antenna coordinates (referred to herein as the coordinates processor) or it may be the same. For the purposes of discussion and without loss of generality, the input to the methods implemented in this form are presented as a plurality of measurement sets, each measurement set having one or more coordinates in the bases of the selected coordinate system and which represent the measured position of the antenna's phase center at a given time moment. Each measurement set also includes a pole inclination value representative of the pole's inclination angle substantially at the same time moment. By the phrase "substantially at the same time moment," we mean that the inclination value of a measurement set is the inclination value which has a measurement time which is the closest to the measurement time of the set's measured antenna coordinates. This may also be stated in the opposite order: "substantially the same time moment" means in this context that the measured antenna coordinates of a set are those coordinates which have a measurement time which is the closest to the measurement time of the set's inclination value. In preferred embodiments of the present invention, the measurement of a set's antenna coordinates and measurement of the set's inclination angle are done within 5 milliseconds of one another.

The measurement sets can be organized in any number of well known data storage formats, such as a link list of data structures, each such data structure grouping the measured antenna coordinates and pole inclination value of a single measurement set together in a common memory area, or as separate memory arrays, each memory array storing either the pole inclination value or one or more antenna coordinates. A hybrid of these two possible organizations is also possible.

A number of collection processes according to the present invention may be used by the data processor to obtain the measurement sets. In one implementation, the measured antenna coordinates are provided at one or more data input ports of the data processor, and the pole inclination value is provide at another data input port. The collection process periodically directs the data processor to read these ports for their current values at substantially the same time, and to assemble the read values into a data format for a measurement set. This type of passive collection process may be used when the present invention is embodied as an add-on component to existing surveying equipment.

In a more active approach, the collection process directs the data processor to be responsive to a signal generated by the coordinates processor which indicates when a new set of measured antenna coordinates are available at the data input port, in response to which the data processor reads in the newly-available measured antenna coordinates. The collection process may then direct the data processor to passively read the input data port which conveys the pole inclination value, or direct the data processor to actively generate a request signal to inclinometer 130 instructing it to output an inclination value at the time of the request. In general, such a request and the returned data can be generated within a few milliseconds, which is generally very short compared to the rate at which the measured antenna coordinates are generated. In this more active approach, the data processor may be the same as the coordinates processor, such as in the case where the present invention is embodied as an integrated surveying product, or it can be separate from the coordinates processor, such as when the present invention is embodied as an add-on component for existing surveying equipment. When the data processor and the coordinates processor are the same, the input data port which conveys the measured antenna coordinates may comprise one or more memory registers of the processor.

In the case where the data processor and the coordinates processor are the same, another collection approach may be used. Specifically, when the processor receives the raw pseudorange information and carrier phase information from the DLLs and PLLs, it may execute a set of subroutine instructions which directs the processor to obtain the inclination value from inclinometer 130 at nearly the same time the raw pseudorange information and carrier phase information become available. The inclination value may be obtained by either of the active or passive approaches described above. The processor may then generate the measured antenna coordinates from the raw pseudorange information and carrier phase information, after which the measured antenna coordinates and the previously measured inclination value are stored in the selected data format. In yet another approach, the measured antenna coordinates are stored in an array as they become available along with an indication of the time they were made, as provided by the processor's time clock. The pole inclination values are similarly stored. The measurement sets are constructed by selecting specific time moments, and then mathematically interpolating across the information stored in these arrays to generate coordinates and inclination values for the measurement sets.

It may be appreciated that the steps of swinging the pole and collecting the data may be done first during a first time duration, and once the data is collected, the data processor may carry out the step of generating the estimate of the target point coordinates at a later time. It may also be appreciated, as indicated above, that the data collection process and the estimation process may occur simultaneously.

For post-processing implementations, the satellite pseudorange data, satellite carrier phase data, and pole inclination data may be collected and stored in a memory along with an indication of the time at which the data were measured. The satellite data may be collected in either the active or passive ways described above for the antenna coordinates, and the pole inclination value may be collected in either of the previously-described active or passive ways. The stored data may then be read later by a coordinates processor, along with corresponding pseudorange and carrier phase data from the base station, and measured antenna coordinates generated therefrom. After that, the data processor according to the present invention may generate an estimate from the generated measured antenna coordinates and the stored inclination data.

In one implementation according to the present invention, a computation of the estimate $(x_t, y_t, z_t)$ is made along with the ambiguity resolution procedure. This enables one to speed up both the ambiguity resolution procedure compared to the first embodiment and obtaining the estimate $(x_t, y_t, z_t)$.

While the present invention has thus far been described using a range pole, it may be appreciated that a range pole is a specific example of a mechanical structural member, and that other examples of mechanical structural members may be used. The structural member has a pivot point placed at the target point, a moveable end having at least one degree of freedom and to which antenna 105 is attached, and an orientation axis which passes through the pivot point and a point on the antenna. The orientation axis serves the same purpose as the pole's center axis in defining the inclination angle for measurement, and preferably passes through a point close to the phase center of the antenna (at least closer to the phase center of the antenna than the outer edge of the antenna). Inclinometer 130 and its tilt sensor are mounted on the structural member, preferably at a location which is closer to the pivot point than the moveable end.

Many types of structural members may be used, including members composed of a single structural piece, such as a bar, an I-beam or tube; and can be composed of multiple structural pieces, such as a plurality of principal bars or tubes arranged generally parallel to one another or slightly inclined to one another with a plurality of cross bars or cross tubes affixed between the principal bars or tubes to tie them together. Such structural members may be used in applications where the antenna is mounted on a mobile vehicle and where the present invention is principally used to reduce the errors caused by multipath signals. In such an application, the pivot point may be coupled to the target point of the vehicle by a flexible U-joint or ball-and-cup joint (for two degrees of freedom), or to a simple sleeve-and-bolt joint (for one degree of freedom). It may be appreciated that, in such cases, a wide variety of tilt-sensors may be used.

In the case of where a structural member is mounted on a physical object, such as a vehicle, one may use a height sensor which measures the height (i.e., distance) H between the antenna and a horizontal plane which passes through the pivot point. The height $H_i$ at a measurement point "i" is related to the inclination angle $\theta_i$ and distance r as follows: $H_i = r \cos \theta_i$. Equations [8], [8A]–[8C], [9], and [9A]–[9C] may be used by substituting the quantity $\sqrt{r^2 - H_i^2}$ for $r \sin \theta_i$, and any of the above-described non-linear least squares processes may be used as described above with this substitution.

It may be further appreciated that a structural member may comprise a mechanical mechanism that is constructed so that the distance r can be varied instead of being fixed. The above forms and equations that we have previously described would then be modified by substituting a measured value $r_i$ of the length in each i-th equation for the previously fixed value r. While this embodiment requires additional work in measurements and computations, it may provide the benefit of reducing multipath errors for some types of surveying environments.

It may be further appreciated that, in the embodiments described thus far, the methods thereof generate the estimate of the target point coordinates without the use of, or reliance on, measured values of the azimuth angle $\phi$; and that the apparatuses thereof operate without the use of, or reliance on, azimuth angle sensors.

Further Embodiments of the Present Invention

Thus far, we have described embodiments of the present invention where the distance r and the inclination angle of the pole $\theta$ were used to compute estimates of one or more of the target point's coordinates. We can broaden the present invention by recognizing that the orientation axis of the structural member may be viewed as an orientation vector having an origin at the pivot point (which is near or at the target point), an end-point located at a point on the antenna, a length r, an inclination angle $\theta$ relative to the plumb-position axis, and an azimuth angle $\phi$ about the plumb-position axis and in a plane which is perpendicular to the plumb-position axis and which intersects the pivot point. We further recognize that the radius r and angles $\theta$ and $\phi$ are parameters of the orientation vector, with at least one of the parameters being adjusted by the structural member. We then propose that we can estimate values for $x_t$, $y_t$, and $z_t$ from measurement of just two of the three parameters (r $\theta$ $\phi$) and the antenna data. We have already described this for the pair of (r, $\theta$). We now describe estimation processes and apparatuses using the pairs (r, $\phi$) and ($\theta$, $\phi$).

Using Parameters r and $\phi$

We examine the case where we use parameters r and $\phi$, and where the inclination angle $\theta$ is unknown. r can be set at a fixed, known value, or it can be varied by the mechanism and measured. $\phi$ is varied and measured. Equations [2] and [3] can be combined to eliminate $\theta$ and produce the following relationship:

$$(x_{ai}-x_t)/(y_{ai}-y_t) = \cot(\phi_i), i=1 \text{ to } N \qquad [18]$$

and further to $$(x_{ai}-x_t) = (y_{ai}-y_t) \cot(\phi_i), i=1 \text{ to } N \qquad [19]$$

which is a set of linear equations. Equation [10] or a linear least squares method may be used to solve equation [19] to generate estimates for $x_t$ and $y_t$ from the measured azimuth angles $\phi_i$. Once estimates for $x_t$ and $y_t$ are found, an estimate for $z_t$ may be found by solving one or more of the following set of equations:

$$z_{ai}-z_t = \sqrt{\sqrt{r^2-(x_{ai}-\hat{x}_t)^2}/\cos^2\phi_i}, i=1 \text{ to } N, \qquad [20]$$

where $\hat{x}_t$ is the estimate for $x_t$ found from solving equation [19]. While equation [20] appears to be non-linear, it is actually linear since the right-hand side reduces to a number because r, $x_{ai}$, $\hat{x}_t$, and $\phi_i$ are known. Further, one may determine an estimate for $z_t$ as an average of two or more of the equations:

$$z_t = z_{ai} - \sqrt{r^2 - (x_{ai} - \hat{x}_t)^2/\cos^2\phi_i}, \quad i=1 \text{ to } N, \quad [21A]$$

$z_t$ may also be found by solving one or more of the following set of equations:

$$z_{ai} - z_t = \sqrt{r^2 - (y_{ai} - \hat{y}_t)^2/\sin^2\phi_i}, \quad i=1 \text{ to } N, \quad [21B]$$

where $\hat{y}_t$ is the estimate for $y_t$ found from solving equation [19].

Using Parameters θ and φ

Equation [19] has eliminated parameter r and may therefore be solved to generate estimates for $x_t$ and $y_t$ from the measured azimuth angles $\phi_i$.

To generate estimates for $z_t$, equation [2] may be divided by equation [4], and equation [3] may be divided by equation [4] to eliminate parameter r and generate the following set of equations:

$$(z_{ai} - z_t)/(x_{ai} - x_t) = \cot\theta_i/\cos\phi_i, \quad i=1 \text{ to } N,$$

$$(z_{ai} - z_t)/(y_{ai} - y_t) = \cot\theta_i/\sin\phi_i, \quad i=1 \text{ to } N, \quad [22]$$

and rearranged to produce the following linear set of equations:

$$(z_{ai} - z_t) = (x_{ai} - x_t)*(\cot\theta_i/\cos\phi_i), \quad i=1 \text{ to } N,$$

$$(z_{ai} - z_t) = (y_{ai} - y_t)*(\cot\theta_i/\sin\phi_i), \quad i=1 \text{ to } N. \quad [23]$$

This is a set of 2N linear equations which may be solved by equation [10] or by a linear least squares fitting program. Alternatively, once estimates for $x_t$ and $y_t$ have been found from the solution of equation [19], the following equations may be formed and averaged to generate an estimate for $z_t$:

$$z_t = z_{ai} - (x_{ai} - \hat{x}_t)*(\cot\theta_i/\cos\phi_i), \quad i=1 \text{ to } N,$$

$$z_t = z_{ai} - (y_{ai} - \hat{y}_t)*(\cot\theta_i/\sin\phi_i), \quad i=1 \text{ to } N. \quad [23]$$

Thus, we may broadly say that exemplary methods according to the present invention comprise the steps of moving the moveable end of the structural member while keeping the pivot point of the structural member at the target point; measuring, during this movement step, two or more sets of parameters and obtaining two or more corresponding sets of measured antenna coordinates from the navigation system, with each measured set of parameters having at least two r, θ, and φ; and generating an estimate for at least one of the coordinates from the measured parameters and the measured antenna coordinates. The estimate for the coordinates of the pivot point are, of course, estimates for the coordinates of the target point. Using additional sets of parameters and measured antenna coordinates provides the benefit of reducing the errors in the estimates caused by multipath effects. Three such sets are preferred to two sets, and four sets are more preferred to three sets, and so on.

Apparatuses according to the present invention support the above methods by using the components of the exemplary apparatus that were described above, and including additional sensors as needed to measure r and φ.

Figure 7:
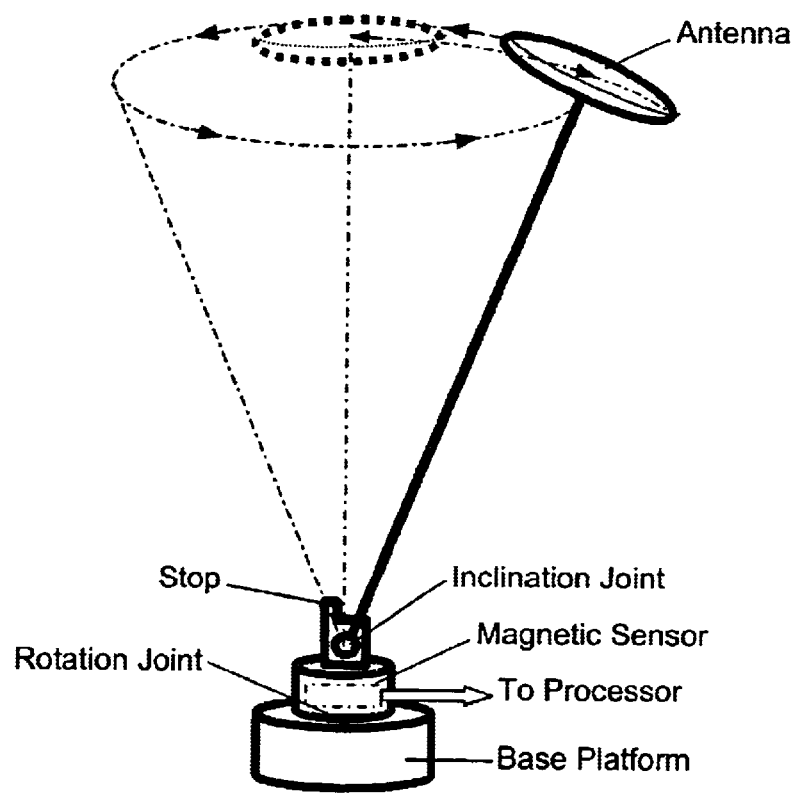
FIG. 7 shows an exemplary azimuth angle sensor according to the present invention which uses a conventional magnetic azimuth angle sensor.

There are many approaches for measuring the azimuth angle φ. As one approach, one may use an electronic magnetic sensor which uses the earth's magnetic field. Such a sensor comprises two-axis magnetic sensors and can electrically resolve the azimuth angle to better than 0.1 degree of rotation. The azimuth angle φ determined from the earth's magnetic fields in a horizontal plane as atan(Ux/Uy), where Ux and Uy are voltages from the X and Y-axial sensors, each voltage being proportional to the intensity of magnetic field along the axis of the corresponding axial sensor. Common technologies for the axial sensor include flux gate devices and magnetoresistive devices. A flux gate device comprises coils wrapped around a ferromagnetic core, with the magnetic induction of the core changing in the presence of an external magnetic field. A magnetoresistive sensor device typically comprises a nickel-iron (permalloy) thin film which is deposited on a silicon wafer and is thereafter patterned as a resistive strip. The properties of this film cause the film to change its resistance in the presence of the magnetic field. An exemplary magnetic sensor that may be used in the present invention is Honeywell's HMR3000 Digital Compass Module. As applied in the context of the present invention, the magnetic sensor is attached to the range pole or other mechanical structural member in a manner that enables the sensor to measure the Earth's magnetic field in the X-Y plane that is substantially level to the Earth's surface. FIG. 7 shows an exemplary structural mechanism which uses a magnetic sensor to measure the azimuth angle. It comprises a base platform, a 360-degree azimuth rotating joint, magnetic sensor placed in a housing, an inclination joint, and a pole to hold the antenna. The inclination joint is disposed on top of the sensor's housing, and it holds the pole. The rotating joint is attached between the base platform and the bottom of the sensor's housing. The rotating joint allows the housing, inclination joint, and pole to rotate through the 360-degree full circle of the azimuth angle. The magnetic sensor measures the azimuth angle, and provides measured results to the processor. The inclination joint allows the pole to move in one degree of freedom, from the top position down to one side. Two-sided motion is prevented by a stop (two-sided motion in the inclination joint would cause an ambiguity in the measurement of the azimuth angle). The main drawback of the magnetic compass is its susceptibility to the spurious influence of nearby iron items and random magnetic fields.

Figure 8:
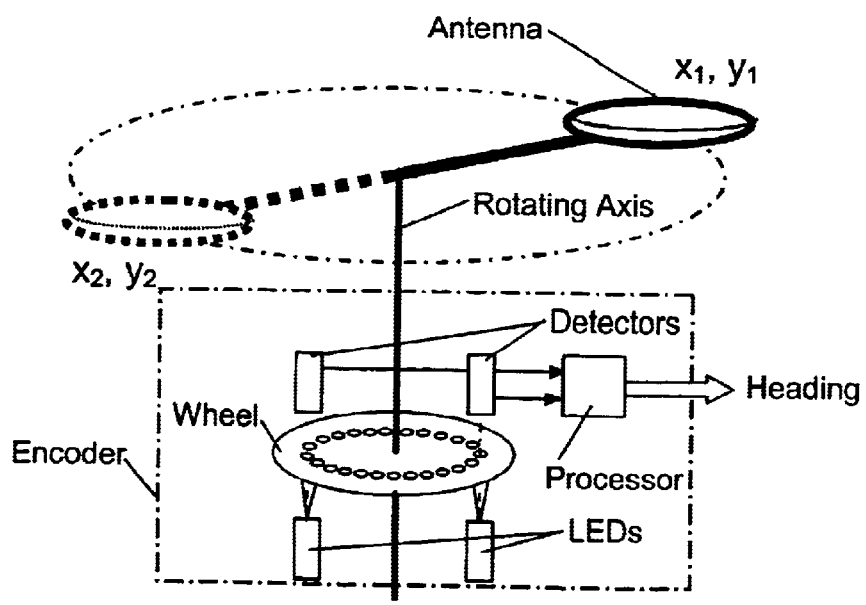

For some embodiments of the mechanical structural member, an Opto-mechanical angular encoder may be used. Typically, such a sensor comprises two light-emitting diode (LED) light sources, a wheel with holes, photo detectors and a microprocessor, as shown in FIG. 8. This embodiment comprises a vertical rotating axis with a bottom end located at the target point and a top end, and extension arm having a first end attached to the top end of the vertical rotating axis and a second end for holding the antenna. The sensor's wheel is attached to the rotating axis, or integrally formed therewith, such that its holes are symmetrically distributed about the center axis of the rotating axis. The light from each LED passes through the holes of the rotated wheel and is detected by a respective photodetector. The processor counts the electrical pulses from each detector. The difference between the position of the detectors on the different sides causes the two detectors to see pulses of light at slightly different times. The processor can then determine the direction of counting, and from that the direction of rotation. The Azimuth angle can be accurately estimated as the number of pulses multiplied by the angle between adjacent holes. However, the value found this way is a relative value, not an absolute value. The relative value differs from the true absolute value by a constant which depends upon the initial antenna angular position. The simplest way to initialize the heading is to measure the antenna coordinates in two opposite positions $(x_1, y_1)$ and $(x_2, y_2)$, where axis X is directed to the East and axis Y is directed to the North. If the counter computes $N_1$ pulses, then the initial heading will be:

$$\varphi_1 = a\tan\frac{x_2 - x_1}{y_2 - y_1} - N_1\Delta\varphi, \qquad [24]$$

where $\Delta\varphi$ is the angle between adjacent holes. Then azimuth for the i-th time moment will be $$\phi_i = N_i\Delta\phi + \phi_1, \qquad [25]$$

where $N_i$ is the number of pulses for the i-th time moment. In the embodiment shown in FIG. 8, the length of the vertical rotating axis may be held in a fixed position, or may be varied. In the latter case, a distance axis (described below) may be used to measure the length of the vertical rotating axis. Likewise, the length of the arm may be fixed or varied. In any of these cases and combinations thereof, the distance r may be computed by the Pythagorean theorem or other trigonometric relationships, with the lengths of the rotating axis and arm and the angle therebetween being measured or known beforehand. The inclination angle may also be computed from a number of well known trigonometric relationships.

Figure 9:
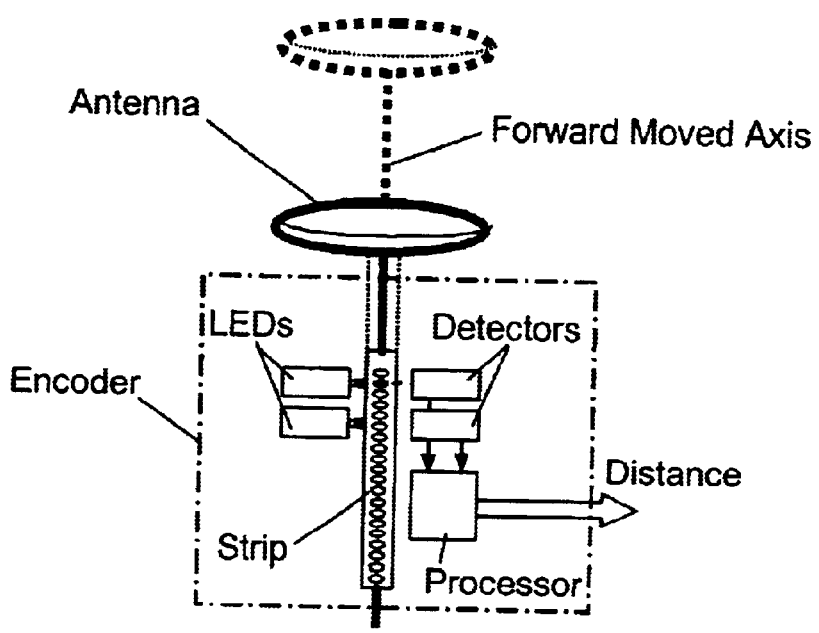
FIG. 9 shows an exemplary length sensor according to the prior art which may be used in implementing the present invention.

For measuring distance r and other lengths (discussed above) an opto-mechanical linear encoder may be used, an example of which is shown in FIG. 9. The operating principle of such a device is similar to the angular encoder described above except that it uses a strip with holes instead of a wheel with holes. The distance can be accurately estimated as:

$$R_i = N_i\Delta R + R_1$$

where $R_1$ is the distance to the first hole, and $\Delta R$ is the distance between adjacent holes.

Computer Program Products

Figure 10:
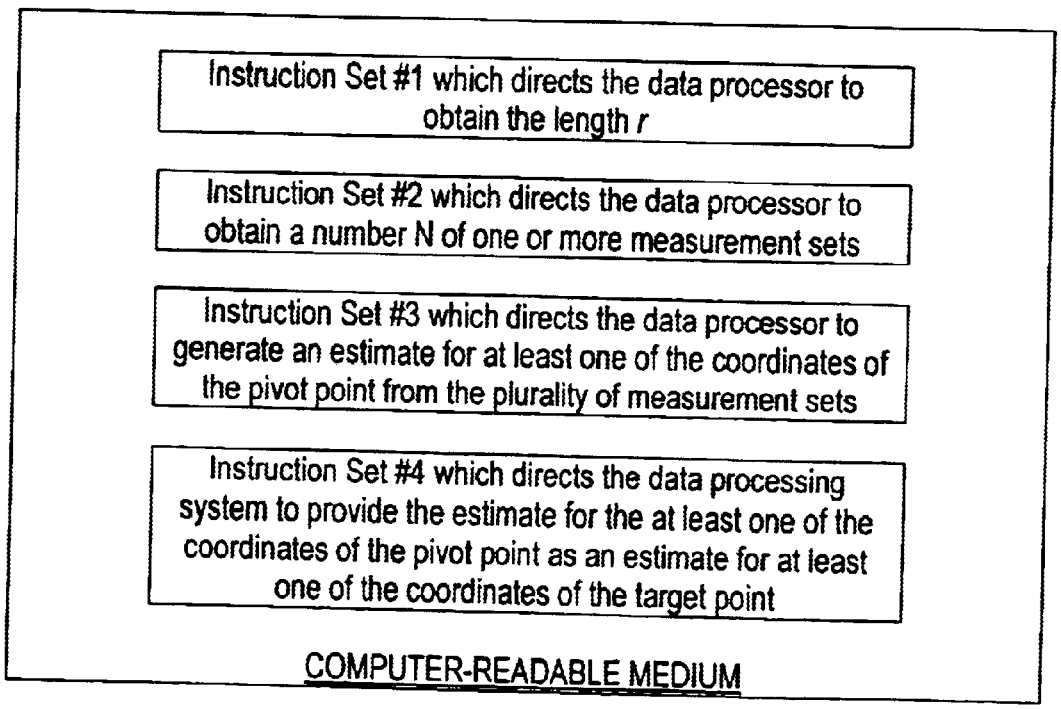

Any of the above methods of estimating the coordinates of the target point may be implemented by a respective computer program product which directs a data processing system, such as a microcomputer, to compute one of more estimates of one or more corresponding coordinates. Each computer program product comprises a computer-readable memory, such as for example ROM, RAM, magnetic tape, magnetic disk, etc., and a plurality of sets of instructions embodied on the computer-readable medium, each set directing the data processing system to execute a respective step of the method being implemented. As an example, FIG. 10 shows a general set of instructions of a computer program product that generates the estimates from the distance r, the inclination angle, and the antenna coordinates. As another example, FIG. 11 shows a general set of instructions of a computer program product that generates the estimates from two parameters of the orientation vector and the antenna coordinates. Each of the sets of instructions may comprise subsets of instructions.

While the present invention has been particularly described with respect to the illustrated embodiments, it will be appreciated that various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A method of estimating the position of a target point within a coordinate system using a structural member having pivot point placed at the target point and a moveable end having at least one degree of freedom, a satellite navigation system having an antenna mounted to the moveable end, and a tilt sensor, the coordinate system having three bases for defining the coordinates of the system and a plumb-position axis oriented within the coordinate system which is collinear with the direction of gravitational pull at the target point, the structural member having an orientation axis passing through the pivot point and a point on the antenna, the tilt sensor measuring an inclination angle ($\theta$) between the orientation axis and the plumb-position axis and providing measured inclination data representative thereof, the antenna having a phase center, the satellite navigation system measuring the position of the antenna's phase center and providing measured coordinates therefor within the coordinate system, said method comprising:
    (a) moving the moveable end of the structural member while keeping the pivot point of the structural member at the target point;
    (b) determining a distance between the phase center of the antenna and the pivot point;
    (c) obtaining, during the performance of step (a), one or more measured inclination values from the tilt sensor and one or more corresponding sets of measured antenna coordinates from the navigation system; and
    (d) generating an estimate for at least one of the coordinates of the pivot point from the measured antenna coordinates, the measured inclination data, and the distance between the phase center of the antenna and the pivot point, the estimate for said at least one of the coordinates of the pivot point being an estimate for at least one of the coordinates of the target point.

2. The method of claim 1 wherein the structural member comprises a range pole having a first end as the pivot point, a second end as the moveable end, and a pole axis as the orientation axis, and wherein step (a) comprises the step of swinging the range pole.

3. The method of claim 1 wherein the orientation angle has an azimuth angle $\phi$ about the plumb-position axis and in a plane which is perpendicular to the plumb-position axis and which intersects the pivot point, wherein step (d) generates the estimate without reliance on measured values of the azimuth angle $\phi$.

4. A method according to claim 1 wherein the first and second bases of the coordinate system span a plane which is perpendicular to the plumb-position axis;
    wherein step (c) obtains two or more measured inclination values from the tilt sensor and two or more corresponding sets of measured antenna coordinates;
    wherein the third basis comprising a Z-axis which is parallel to the plumb-position axis; and wherein step (d) comprises:
        generating an estimate of the Z-axis coordinate of the pivot point from one or more measured inclination values and the one or more corresponding sets of measured antenna coordinates; and
        generating estimates of the coordinates of the pivot point in the first and second bases from two or more measured inclination values and the two or more corresponding sets of measured antenna coordinates.

5. A method according to claim 1 further comprising measuring the temperature of the tilt sensor, and wherein the measure inclination data is corrected to account for temperature effects on the sensor.

6. A method according to claim 1 wherein the tilt sensor is mounted on the structural member at a location which is closer to the pivot point than the moveable end.

7. A method according to claim 6 wherein the tilt sensor is mounted at the bottom end of the range pole.

8. A method according to claim 1 wherein the moveable end of the structural member is moved such that the orientation axis of the structural member moves within a sector angle relative to the plumb position axis of at least 5 degrees.

9. A method according to claim 1 wherein the structural member is rotated about the orientation axis during the performance of step (a).

10. A method according to claim 1 wherein said measured antenna coordinates and measured inclination data are obtained at a frequency of at least 1 Hz.

11. A method according to claim 1 wherein said step (d) is performed with two or more iterative processing steps while new measured antenna coordinates and new measure inclination data are obtained in a real-time environment, and wherein one or more of the iterative processing steps operate on the new measured antenna coordinates new measured inclination values as they are obtained.

12. A method according to claim 1 wherein steps (a) and (c) are performed during a first duration of time with the obtained measured antenna coordinates and measured inclination data being stored in a computer readable medium, and wherein step (d) is performed during a subsequent time duration using the measured antenna coordinates and measured pole-inclination data stored in said computer readable medium.

13. A method according to claim 1 wherein step (c) obtains the measured antenna coordinates from a coordinates processor which determines the measured antenna coordinates relative to a base station with a baseline vector formed between the base station and the antenna's phase center, and wherein the coordinates processor resolves the phase ambiguities of the satellites signals relative to the baseline vector.

14. A method according to claim 1 wherein the antenna receives a multipath satellite signal which causes a first error in the measured antenna coordinates and a second error in the estimate;
   wherein step (c) obtains two or more measured inclination values from the tilt sensor and two or more corresponding sets of measured antenna coordinates from the navigation system; and
   wherein step (d) generates the estimate from the measured antenna coordinates and measured inclination values such that the second error is less that the first error when the first error is obtained with the antenna positioned directly over the target point.

15. A method according to claim 1 wherein the antenna receives a multipath satellite signal which causes a first error in the measured antenna coordinates and a second error in the estimate;
   wherein step (c) obtains three or more measured inclination values from the tilt sensor and three or more corresponding sets of measured antenna coordinates from the navigation system; and
   wherein step (d) generates the estimate from the measured antenna coordinates and measured inclination data of the plurality of three or more different antenna positions such that the second error is less that the first error when the first error is obtained with the antenna positioned directly over the target point.

16. A method of estimating the position of a target point within a coordinate system using a structural member having pivot point placed at the target point and a moveable end having at least one degree of freedom, and using a satellite navigation system having an antenna mounted to the moveable end, the coordinate system having three bases for defining the coordinates of the system and a plumb-position axis oriented within the coordinate system which is collinear with the direction of gravitational pull at the target point, the structural member having an orientation vector with an origin at the pivot point, an end-point located at a point on the antenna, a length r, an inclination angle $\theta$ relative to the plumb-position axis, and an azimuth angle $\phi$ about the plumb-position axis and in a plane which is perpendicular to the plumb-position axis and which intersects the pivot point, the radius r and angles $\theta$ and $\phi$ being parameters of the orientation vector and at least one of the parameters being adjusted by the structural member, the antenna having a phase center, the satellite navigation system measuring the position of the antenna's phase center and providing measured coordinates therefor within the coordinate system as its output data, said method comprising the steps of:
   (a) moving the moveable end of the structural member while keeping the pivot point of the structural member at the target point;
   (b) measuring, during the performance of step (a), two or more sets of parameters of the orientation vector and obtaining two or more corresponding sets of measured antenna coordinates from the navigation system, each measured set of parameters of the orientation vector having at least two of the parameters r, $\theta$, and $\phi$; and
   (c) generating an estimate for at least one of the coordinates of the pivot point from the measured parameters of the orientation vector and the measured antenna coordinates, the estimate for said at least one of the coordinates of the pivot point being an estimate for at least one of the coordinates of the target point.

17. A method according to claim 16 wherein the first and second bases of the coordinate system span a plane which is perpendicular to the plumb-position axis;
   wherein the third basis comprising a Z-axis which is parallel to the plumb-position axis; and wherein step (c) comprises:
      generating an estimate of the Z-axis coordinate of the pivot point from one or more sets of measured parameters and the one or more corresponding sets of measured antenna coordinates; and
      generating estimates of the coordinates of the pivot point in the first and second bases from two or more sets of measured parameters and the two or more corresponding sets of measured antenna coordinates.

18. A method according to claim 16 wherein the antenna receives a multipath satellite signal which causes a first error in the measured antenna coordinates and a second error in the estimate;
   wherein step (b) measures two or more sets of parameters of the orientation vector and obtains two or more corresponding sets of measured antenna coordinates; and
   wherein step (d) generates the estimate from the sets of measured parameters and antenna coordinates such that the second error is less that the first error when the first error is obtained with the antenna positioned directly over the target point.

19. A method according to claim 16 wherein the antenna receives a multipath satellite signal which causes a first error in the measured antenna coordinates and a second error in the estimate;

wherein step (b) measures three or more sets of parameters of the orientation vector and obtains three or more corresponding sets of measured antenna coordinates; and wherein step (d) generates the estimate from the sets of measured parameters and antenna coordinates such that the second error is less that the first error when the first error is obtained with the antenna positioned directly over the target point.

20. A survey apparatus for use with a global positioning satellite system to measure the coordinates of a target point within a coordinate system, the coordinate system having three bases for defining the coordinates of the system and a plumb-position axis oriented within the coordinate system which is collinear with the direction of gravitational pull at the target point, the survey apparatus comprising:

a satellite navigation system receiver having an antenna and an output providing measured antenna coordinates representative of the position of a phase center of the antenna;

a structural member having a pivot point for placement at the target point, a moveable end for holding the antenna and having at least one degree of freedom, an orientation axis passing through the pivot point and a point on the antenna, and a distance between the pivot point and said point on the antenna as measured along the orientation axis;

a tilt sensor mounted to structural member and having an output that provides measured inclination data which is representative of the angle between the orientation axis and the plumb-position axis;

a data processor which receives the measured inclination data output by said tilt sensor and the measured antenna coordinates output by said satellite navigation system; and a first program of instructions stored on a computer-readable medium which directs the data processor to generate an estimate for at least one of the coordinates of the pivot point from the distance, the measured antenna coordinates, and the measured inclination data.

21. A survey apparatus according to claim 20 wherein the structural member comprises a range pole having a first end as the pivot point, a second end as the moveable end, and a pole axis as the orientation axis, and wherein step (a) comprises the step of swinging the range pole.

22. A survey apparatus according to claim 20 wherein the data processor is part of a satellite navigation system receiver.

23. The method of claim 20 wherein the orientation angle has an azimuth angle $\phi$ about the plumb-position axis and in a plane which is perpendicular to the plumb-position axis and which intersects the pivot point, wherein the first program of instructions directs the data processor to generate the estimate without reliance on measured values of the azimuth angle $\phi$.

24. A survey apparatus according to claim 20 wherein the first and second bases of the coordinate system span a plane which is perpendicular to the plumb-position axis, wherein the third basis comprising a Z-axis which is parallel to the plumb-position axis, and wherein said program of instructions directs the data processor to generate an estimate of the Z-axis coordinate of the pivot point from the distance between the pivot point and the antenna, the measured antenna coordinates, and measured inclination data obtained at one or more of the time moments, and directs the data processor to generate estimates of the coordinates of the pivot point in the first and second bases from the measured antenna coordinates and inclination data obtained at three or more of the time moments.

25. A survey apparatus according to claim 20 further comprising a temperature sensor which measures the temperature of the tilt sensor, and wherein the measure inclination data is corrected to account for temperature effects on the sensor.

26. A survey apparatus according to claim 20 wherein the tilt sensor is mounted on the structural member at a location which is closer to the pivot point than the moveable end.

27. A survey apparatus according to claim 21 wherein the tilt sensor is mounted at the bottom end of the range pole.

28. A survey apparatus according to claim 20 wherein said program of instructions directs the data processor to generate the estimate by a series of iterations while new measured antenna coordinates and new measure inclination data are obtained in a real-time environment, and directs the data processor to use the new measured antenna coordinates new measured inclination data in one or more of the iterations as they are obtained.

29. A survey apparatus for use with a global positioning satellite system to measure the coordinates of a target point within a coordinate system, the coordinate system having three bases for defining the coordinates of the system and a plumb-position axis oriented within the coordinate system which is collinear with the direction of gravitational pull at the target point, the survey apparatus comprising:

a satellite navigation system receiver having an antenna and providing a plurality of measured satellite pseudo-range data and satellite carrier phase data;

a structural member having a pivot point for placement at the target point, a moveable end for holding the antenna and having at least one degree of freedom, and an orientation axis between the pivot point and a point on the antenna;

a tilt sensor mounted to structural member and having an output that provides measured inclination data which is representative of the angle between the orientation axis and the plumb-position axis;

a first data processor which receives the measured inclination data output by said tilt sensor and the measured pseudorange and carrier phase data from the satellite navigation system at a plurality of time moments; and a first program of instructions stored on a first computer-readable medium which directs the first data processor to store the measured inclination data and the measured pseudorange and carrier phase data for a plurality of time moments in a second computer readable medium.

30. A survey apparatus according to claim 29 wherein a set of measured antenna coordinates is generated from the measured satellite pseudorange data and carrier phase data stored in said second computer readable medium and from measured satellite pseudorange data and satellite carrier phase data from a base station; wherein there is a distance between the pivot point and a point on the antenna as measured along the orientation axis, and wherein said survey apparatus further comprises:

a second data processor which receives the generated set of antenna coordinates and the measured inclination data stored in said second computer readable medium; and a second program of instructions stored on a computer readable medium which directs the second data processor to generate an estimate for at least one of the coordinates of the pivot point from the distance between the pivot point and the antenna, the measured antenna coordinates and the measured inclination data of a plurality of time moments.

31. A survey apparatus for use with a global positioning satellite system to measure the coordinates of a target point within a coordinate system, the coordinate system having three bases for defining the coordinates of the system and a plumb-position axis oriented within the coordinate system which is collinear with the direction of gravitational pull at the target point, the survey apparatus comprising:

a satellite navigation system receiver having an antenna, the antenna having a phase center, the satellite navigation system measuring the position of the antenna's phase center and providing measured coordinates therefor within the coordinate system as its output data;

a structural member having a pivot point for placement at the target point, a moveable end configured to hold the antenna and having at least one degree of freedom, and an orientation vector with an origin at the pivot point, an end-point located at a point on the antenna, a length r, an inclination angle θ relative to the plumb-position axis, and an azimuth angle φ about the plumb-position axis and in a plane which is perpendicular to the plumb-position axis and which intersects the pivot point, the radius r and angles θ and φ being parameters of the orientation vector and at least one of the parameters being adjusted by the structural member;

a first sensor configured to measure one of the parameters of the orientation vector and provide measured values thereof, and an second sensor configured to measure another one of the parameters of the orientation vector and provide measured values thereof;

a first data processor which receives the measured parameters and the measured antenna coordinates; and a first program of instructions stored on a computer-readable medium which directs the first data processor to generate an estimate for at least one of the coordinates of the pivot point from the measured parameters of the orientation vector and the measured antenna coordinates.

32. The survey apparatus of claim 31 wherein the first and second bases of the coordinate system span a plane which is perpendicular to the plumb-position axis;

wherein the third basis comprising a Z-axis which is parallel to the plumb-position axis; and wherein the first program of instructions directs the first data processor to generate an estimate of the Z-axis coordinate of the pivot point from one or more sets of measured parameters and the one or more corresponding sets of measured antenna coordinates, and directs the first data processor to generate estimates of the coordinates of the pivot point in the first and second bases from two or more sets of measured parameters and the two or more corresponding sets of measured antenna coordinates.

33. A survey apparatus for use with a global positioning satellite system to measure the coordinates of a target point within a coordinate system, the coordinate system having three bases for defining the coordinates of the system and a plumb-position axis oriented within the coordinate system which is collinear with the direction of gravitational pull at the target point, the survey apparatus comprising:

a satellite navigation system receiver having an antenna, the antenna having a phase center, the receiver providing a plurality of measured satellite pseudorange data and satellite carrier phase data;

a structural member having a pivot point for placement at the target point, a moveable end configured to hold the antenna and having at least one degree of freedom, and an orientation vector with an origin at the pivot point, an end-point located at a point on the antenna, a length r, an inclination angle θ relative to the plumb-position axis, and an azimuth angle φ about the plumb-position axis and in a plane which is perpendicular to the plumb-position axis and which intersects the pivot point, the radius r and angles θ and φ being parameters of the orientation vector and at least one of the parameters being adjusted by the structural member;

a first sensor configured to measure one of the parameters of the orientation vector and provide measured values thereof, and an second sensor configured to measure another one of the parameters of the orientation vector and provide measured values thereof;

a first data processor which receives the measured parameters and the measured pseudorange and carrier phase data from the satellite navigation system at a plurality of time moments; and a first program of instructions stored on a computer-readable medium which directs the first data processor to store the measured parameters and the measured pseudorange and carrier phase data for a plurality of time moments in a second computer readable medium.

34. A survey apparatus according to claim 33 wherein a set of measured antenna coordinates is generated from the measured satellite pseudorange data and carrier phase data stored in said second computer readable medium and from measured satellite pseudorange data and satellite carrier phase data from a base station; and wherein said survey apparatus further comprises:

a second data processor which receives the generated set of antenna coordinates and the measured inclination data stored in said second computer readable medium; and a second program of instructions stored on a computer readable medium which directs the second data processor to generate an estimate for at least one of the coordinates of the pivot point from parameters of the orientation vector and the measured antenna coordinates of a plurality of time moments.

35. A method of estimating the position of a target point within a coordinate system using a structural member having pivot point for contacting the target point and a moveable end having at least one degree of freedom, a satellite navigation system having an antenna mounted to the moveable end, and a tilt sensor, a plumb-position axis being present within the coordinate system which is collinear with the direction of gravitational pull at the target point, the coordinate system having three bases for defining the coordinates of the system with one of the bases comprising a Z-axis parallel to the plumb-position axis, the pivot point having a respective set of coordinates which describe its location within the coordinate system, the structural member having an orientation axis passing through the pivot point and a point on the antenna, the tilt sensor measuring an inclination angle (θ) between the orientation axis and the plumb-position axis and providing measured inclination value representative thereof, the antenna having a phase center and the satellite navigation system measuring the position of the antenna's phase center and providing measured coordinates therefor within the coordinate system, said method comprising the steps of:

(a) obtaining a length r representative of a distance from the pivot point to the phase center of the antenna;

(b) obtaining a number N of one or more measurement sets, each measurement set comprising a measured Z-axis coordinate $z_{ai}$ which represents the measured position of the antenna's phase center along the Z-axis of the coordinate system and a corresponding measured inclination value which is substantially representative of the inclination angle between the orientation axis and the plumb-position, wherein the index "i" represents the identity of the measurement set;

(c) generating an estimated Z-axis coordinate $z_t$ which is representative of the estimated position of the pivot point along the Z-axis, said estimated Z-axis coordinate $z_t$ being generated according to a form which is equivalent to:

$$z_t = E\{z_{ai} - r \cos \theta_i\}, i=1 \ldots N,$$

where $E\{\}$ is the mean value operator, i is an index over the measurement sets, and $\theta_i$ is the inclination angle indicated by the measured inclination value of the i-th measurement set; and (d) providing the estimated Z-axis coordinate $z_t$ as an estimate for the Z-axis coordinates of the target point.

36. The method of claim 35 further comprising the steps of:

receiving M additional measurement sets with M being equal to one or more;

generating a revised estimated value $z_{t,rev}$ of the estimated Z-axis coordinate $z_t$ according to a form which is equivalent to:

$$z_{t,rev} = E\{N \cdot z_t, z_{aj} - r \cos \theta_j\}, j=1 \ldots M,$$

where $E\{\}$ is the mean value operator, j is an index over the additional measurement sets, $z_{aj}$ is the measured Z-axis antenna coordinate of the j-th additional measurement set, and where $\theta_j$ is the inclination angle indicated by the measured inclination value of the j-th additional measurement set; and providing the estimated revised estimated value $z_{t,rev}$ as an estimate for the Z-axis coordinates of the target point.

37. The method of claim 35 wherein the structural member comprises a range pole having a first end as the pivot point, a second end as the moveable end, and a pole axis as the orientation axis, and wherein step (a) comprises the step of swinging the range pole.

38. The method of claim 35 wherein step (a) comprises receiving length r from an external source, and wherein step (b) comprises receiving the one or more measurement sets from an external source.

39. A method of estimating the position of a target point within a coordinate system using a range pole having a first end for contacting the target point, a second end for holding a satellite navigation system antenna which has a phase center, and an axis between the pole's first and second ends, a plumb-position axis oriented within the coordinate system which is collinear with the direction of gravitational pull at the target point, the coordinate system having three bases for defining the coordinates of the system with the first and second bases spanning a plane which is perpendicular to the plumb-position axis and the third basis comprising a Z-axis which is parallel to the plumb-position axis, the first pole end having a respective set of first, second, and third coordinates which describe its location along the first, second, and third bases, respectively, of the coordinate system, the pole having an inclination angle ($\theta$) between its axis and the plumb-position axis, said method comprising the steps of:

(a) obtaining a length r representative of the distance from the first end of the pole to the phase center of the antenna as measure along the pole's axis;

(b) obtaining a number N of two or more measurement sets, each measurement set comprising a first coordinate representative of the measured position of the antenna's phase center along the first basis of the coordinate system, a second coordinate representative of the measured position of the antenna's phase center along the second basis of the coordinate system, and a corresponding pole inclination value representative of the pole's inclination angle;

(c) selecting two measurement sets and forming two corresponding relationships therefor, each relationship using the measured antenna coordinates and measured pole inclination value of its corresponding measurement set, each relationship describing a locus of estimated first and second coordinates for the pole's first end, the locus being such that a line which starts from a first point located at the first two measured antenna coordinates of the measurement set and any third antenna coordinate and which is drawn to any second point on said locus which is a distance r from the first point has an inclination angle which is equal to the angle indicated by the measured pole inclination value of the measurement set;

(d) generating two possible sets of estimates for the first and second coordinates of the pole's first end from the relationships;

(e) receiving an additional position of antenna's phase center measured at an inclination angle of the pole's axis which is less than the inclination angles of the selected measurement sets; and (f) detecting the one of the two possible sets of estimates whose first and second coordinates are closest to the first and second coordinates of the additional position of the antenna's phase center and providing said set as an estimate of the first and second coordinates of the target point.

40. The method of claim 39 wherein the coordinate system comprises Cartesian coordinate system with the first basis comprising an X-axis and the second basis comprising a Y-axis;

wherein said method generates an estimated X-axis coordinate $x_t$ which represents the estimated position of the pole's first end along the X-axis of the coordinate system, and an estimated Y-axis coordinate $y_t$ which represents the estimated position of the pole's first end along the Y-axis of the coordinate system;

wherein the first measured antenna coordinate of each i-th measurement set comprises an X-axis coordinate $x_{ai}$ which represents the measured position of the antenna's phase center along the X-axis of the coordinate system, and wherein the second measured antenna coordinate of each i-th measurement set comprises a Y-axis coordinate $y_{ai}$ which represents the measured position of the antenna's phase center along the Y-axis of the coordinate system, where the index "i" represents the identity of the measurement set and the corresponding relationship;

wherein each relationship of step (c) comprises a first equation which is equivalent to the form: $(x_{ai} - x_t)^2 + (y_{ai} - y_t)^2 = (r \sin \theta_i)^2$, where $\theta_i$ is the pole's inclination angle indicated by the measurement set's measured pole inclination value.

41. The method of claim 39 further comprising receiving a temperature value representative of the temperature during which the measurement sets were made, and correcting the measured inclination values of the measurement sets based on the measured temperature value.

42. A method of estimating the position of a target point within a coordinate system using a structural member having a pivot point for contacting the target point and a moveable end having at least one degree of freedom, a satellite navigation system having an antenna mounted to the moveable end, and a tilt sensor, a plumb-position axis being present within the coordinate system which is collinear with the direction of gravitational pull at the target point, the coordinate system having three bases for defining the coordinates of the system with the first and second bases spanning a plane which is perpendicular to the plumb-position axis and the third basis comprising a Z-axis which is parallel to the plumb-position axis, the pivot point having a respective set of coordinates which describe its location within the coordinate system, the structural member having an orientation axis passing through the pivot point and a point on the antenna, the tilt sensor measuring an inclination angle ($\theta$) between the orientation axis and the plumb-position axis and providing measured inclination value representative thereof, the antenna having a phase center and the satellite navigation system measuring the position of the antenna's phase center and providing measured coordinates therefor within the coordinate system, said method comprising the steps of:

(a) obtaining a length r representative of a distance from the pivot point to the phase center of the antenna;

(b) obtaining a number N of three or more measurement sets, each measurement set comprising a first coordinate representative of the measured position of the antenna's phase center along the first basis of the coordinate system, a second coordinate representative of the measured position of the antenna's phase center along the second basis of the coordinate system, and a corresponding measured inclination value which is substantially representative of the measured inclination angle between the orientation axis and the plumb-position;

(c) forming a number N of relationships with each relationship corresponding to a respective measurement set and using the measured antenna coordinates and measured inclination value of its corresponding measurement set, each relationship describing a locus of estimated first and second coordinates for the pivot point, said locus being such that a line which starts from a first point located at the first two measured antenna coordinates of the measurement set and any third antenna coordinate and which is drawn to any second point on said locus which is a distance r from the first point has an inclination angle which is equal to the angle indicated by the measured pole inclination value of the measurement set; and (d) generating a set of estimates for the first and second coordinates of the pivot point from the relationships and providing said estimates as estimates for the first and second coordinates of the target point.

43. The method of claim 42 wherein the coordinate system comprises Cartesian coordinate system with the first basis comprising an X-axis and the second basis comprising a Y-axis;

wherein said method generates an estimated X-axis coordinate $x_t$ which represents the estimated position of the pivot point along the X-axis of the coordinate system, and an estimated Y-axis coordinate $y_t$ which represents the estimated position of the pivot point along the Y-axis of the coordinate system;

wherein the first measured antenna coordinate of each i-th measurement set comprises an X-axis coordinate $x_{ai}$ which represents the measured position of the antenna's phase center along the X-axis of the coordinate system, and wherein the second measured antenna coordinate of each i-th measurement set comprises a Y-axis coordinate $y_{ai}$ which represents the measured position of the antenna's phase center along the Y-axis of the coordinate system, where the index "i" represents the identity of the measurement set and the corresponding relationship;

wherein each relationship of step (c) comprises a first equation which is equivalent to the form: $\{(x_{ai}-x_t)^2+(y_{ai}-y_t)^2\}^{1/2} = r \sin \theta_i$, where $\theta_i$ is the inclination angle indicated by the measurement set's measured inclination value.

44. The method of claim 43 wherein step (d) comprises the step of generating the estimated coordinates $x_t$ and $y_t$ of the pivot point from a non-linear least-squares fitting of the estimated coordinates $x_t$ and $y_t$ to the first equations of the relationships.

45. The method of claim 44 wherein the non-linear least-squares fitting comprises one or more iterations of generating values for the estimated coordinates $x_t$ and $y_t$, each iteration being represented by an index k, and further comprises steps of:

(e) selecting a set of initial iteration values $x_{t,k}$ and $y_{t,k}$ for the estimated coordinates $x_t$ and $y_t$ for the first iteration (k=1);

wherein each iteration comprises the steps of:

(f) forming a plurality of difference quantities $m_k[i](i=1, 2, \ldots, N)$ corresponding to the number N of relationships, each difference quantity being proportional to the difference between the left and right sides of the first equation of the corresponding relationship with the iteration values $x_{t,k}$ and $y_{t,k}$ being used in the first equations in place of the estimated coordinates $x_t$ and $y_t$, a vector $M_k$ represents the plurality of difference quantities $m_k[i](i=1, 2, \ldots, N)$;

(g) forming a first derivative matrix $H_k$ which comprises the first derivatives of the difference quantities $m_k[i]$ (i=1, 2, ..., N) with respect to the estimated coordinate values $x_t$ and $y_t$, matrix $H_k$ having a transpose matrix $H'_k$;

(h) forming a plurality N of second derivative matrices $G_{k,i}(i=1, 2, \ldots, N)$ of the difference quantities $m_k[i](i=1, 2, \ldots, N)$, the elements of each i-th matrix $G_{k,i}(i=1, 2, \ldots, N)$ comprising the second derivatives of $m_k[i]$ with respect to the estimated coordinate values $x_t$ and $y_t$; and (i) with a vector $X_k$ representing the iteration values $x_{t,k}$ and $y_{t,k}$, generating a set of updated iteration values $x_{t,k+1}$ and $y_{t,k+1}$ according to a form which is equivalent to:

$$X_{k+1} = X_k - \left( H'_k H_k + \sum_{i=1}^{N} m_k[i] G_{k_i} \right)^{-1} H'_k M_k$$

where vector $X_{k+1}$ represents the updated iteration values $x_{t,k+1}$ and $y_{t,k+1}$, and where the operator $(\ )^{-1}$ denotes matrix inversion.

46. The method of claim 45 further comprising the steps of:

repeating steps (f)–(i) one or more times to provide one or more corresponding iterations, at least one component of vector $X_k$ being set equal to its corresponding component of $X_{k+1}$ prior to the start of each such iteration; and thereafter providing the components of $X_{k+1}$ as estimates for the first and second coordinates of the target point.

47. The method of claim 45 further comprising:

receiving M additional measurement sets with M being equal to one or more;

forming M additional relationships corresponding to the M additional measurement sets;

repeating steps (f)–(i) one or more times to provide one or more corresponding iterations, at least one component of vector $X_k$ being set equal to its corresponding component of $X_{k+1}$ prior to the start of each such iteration, wherein $M_k$, $H_k$, and the series of second derivative matrices $G_{k,i}$(i=1, . . . [N+M]) are expand to be representative of the additional relationships for at least one repeated iteration; and thereafter providing the components of $X_{k+1}$ as estimates for the first and second coordinates of the target point.

48. The method of claim 45 wherein the first derivatives of matrix $H_k$ are computed with $x_t=x_{t,k}$ and $y_t=y_{t,k}$, and wherein the second derivative elements of matrices $G_{k,i}$(i=1, 2, . . . , N) are computed with $x_t=x_{t,k}$ and $y_t=y_{t,k}$.

49. The method of claim 42 wherein said method further computes an estimated Z-axis coordinate $z_t$ which is representative of the estimated position of the pivot point along the Z-axis of the coordinate system;

wherein at least one measurement set has a Z-axis coordinate which is representative of the measured position of the antenna's phase center along the Z-axis of the coordinate system; and wherein said method further comprises the step of generating, from a selected measurement set which has a Z-axis coordinate $z_{aS}$, the estimated Z-axis coordinate $z_t$ according to a form which is equivalent to $z_t=z_{aS}-r \cos \theta_S$, where $\theta_S$ is the inclination angle indicated by the measured inclination value of the selected measurement set, and the step of providing the estimated Z-axis coordinate $z_t$ as estimates for the first and second coordinates of the target point.

50. The method of claim 42 wherein said method further computes an estimated Z-axis coordinate $z_t$ which is representative of the estimated position of the pivot point along the Z-axis of the coordinate system;

wherein each i-th measurement set has a Z-axis coordinate $z_{ai}$ which is representative of the measured position of the antenna's phase center along the Z-axis of the coordinate system;

wherein said method further comprises the step of generating the estimated Z-axis coordinate $z_t$ according to a form which is equivalent to:

$$z_t = E\{z_{ai} - r \cos \theta_i\}, \; i=1 \ldots N,$$

where $E\{\}$ is the mean value operator, and the step of providing the estimated Z-axis coordinate $z_t$ as estimates for the first and second coordinates of the target point.

51. The method of claim 44 wherein the non-linear least-squares fitting comprises one or more iterations of generating values for the estimated coordinates $x_t$ and $y_t$, each iteration being represented by an index k, and further comprises the steps of:

(e) selecting a set of initial iteration values $x_{t,k}$ and $y_{t,k}$ for the estimated coordinates $x_t$ and $y_t$ for the first iteration (k=1);

wherein each iteration comprises the steps of:

(f) forming a plurality of difference quantities $m_k[i]$(i=1, 2, . . . , N) corresponding to the number N of relationships, each difference quantity being proportional to the difference between the left and right sides of the first equation of the corresponding relationship with the iteration values $x_{t,k}$ and $y_{t,k}$ being used in the first equations in place of the estimated coordinates $x_t$ and $y_t$, a vector $M_k$ represents the plurality of difference quantities $m_k[i]$(i=1, 2, . . . , N);

(g) forming a first derivative matrix $H_k$ which comprises the first derivatives of the difference quantities $m_k[i]$ (i=1, 2, . . . , N) with respect to the estimated coordinate values $x_t$ and $y_t$, matrix $H_k$ having a transpose matrix matrix $H'_k$;

(h) with a vector $X_k$ representing the iteration values $x_{t,k}$ and $y_{t,k}$, computing a set of updated iteration values $x_{t,k+1}$ and $y_{t,k+1}$ according to a form which is equivalent to:

$$X_{k+1} = X_k - T_k(H_k'H_k)^{-1}H_k'M_k$$

where vector $X_{k+1}$ represents the updated iteration values $x_{t,k+1}$ and $y_{t,k+1}$, where $T_k$ is a scalar value greater than zero, and where the operator $(\;)^{-1}$ denoted matrix inversion.

52. The method of claim 51 further comprising the steps of:

repeating steps (f)–(i) one or more times to provide one or more corresponding iterations, at least one component of vector $X_k$ being set equal to its corresponding component of $X_{k+1}$ prior to the start of each such iteration; and thereafter providing the components of $X_{k+1}$ as estimates for the first and second coordinates of the target point.

53. The method of claim 51 further comprising:

receiving M additional measurement sets with M being equal to one or more;

forming M additional relationships corresponding to the M additional measurement sets;

repeating steps (f)–(i) one or more times to provide one or more corresponding iterations, at least one component of vector $X_k$ being set equal to its corresponding component of $X_{k+1}$ prior to the start of each such iteration, wherein $M_k$ and $H_k$ are expand to be representative of the additional relationships for at least one repeated iteration; and thereafter providing the components of $X_{k+1}$ as estimates for the first and second coordinates of the target point.

54. The method of claim 51 wherein the first derivatives of matrix $H_k$ are computed with $x_t=x_{t,k}$ and $y_t=y_{t,k}$.

55. The method of claim 42 wherein said method further computes an estimated Z-axis coordinate $z_t$ which is representative of the estimated position of the pivot point along the Z-axis of the coordinate system;

wherein at least one measurement set has a Z-axis coordinate which is representative of the measured position of the antenna's phase center along the Z-axis of the coordinate system; and wherein said method further comprises the step of generating, from a selected measurement set which has a Z-axis coordinate $z_{aS}$, the estimated Z-axis coordinate $z_t$ according to a form which is equivalent to $z_t=z_{aS}-r \cos \theta_S$, where $\theta_S$ is the inclination angle indicated by the measured inclination value of the selected measurement set, and the step of providing the estimated Z-axis coordinate $z_t$ as estimates for the first and second coordinates of the target point.

56. The method of claim 52 wherein said method further computes an estimated Z-axis coordinate $z_t$ which is representative of the estimated position of the pivot point along the Z-axis of the coordinate system;

wherein each i-th measurement set has a Z-axis coordinate $z_{ai}$ which is representative of the measured position of the antenna's phase center along the Z-axis of the coordinate system;

wherein said method further comprises the step of generating the estimated Z-axis coordinate $z_t$ according to a form which is equivalent to:

$$z_t = E\{z_{ai} - r \cos \theta_i\}, i=1 \ldots N,$$

where $E\{\}$ is the mean value operator, and the step of providing the estimated Z-axis coordinate $z_t$ as estimates for the first and second coordinates of the target point.

57. The method of claim 42 wherein the structural member comprises a range pole having a first end as the pivot point, a second end as the moveable end, and a pole axis as the orientation axis, and wherein step (a) comprises the step of swinging the range pole.

58. The method of claim 42 wherein step (a) comprises receiving length r from an external source, and wherein step (b) comprises receiving the measurement sets from an external source.

59. A computer program product for directing a computer processor to estimate the position of a target point within a coordinate system using data derived from a structural member having pivot point for contacting the target point and a moveable end having at least one degree of freedom, a satellite navigation system having an antenna mounted to the moveable end, and a tilt sensor, the coordinate system having three bases for defining the coordinates of the system, a plumb-position axis oriented within the coordinate system which is collinear with the direction of gravitational pull at the target point, the pivot point having a respective set of coordinates which describe its location within the coordinate system, the structural member having an orientation axis passing through the pivot point and a point on the antenna, the tilt sensor measuring an inclination angle ($\theta$) between the orientation axis and the plumb-position axis and providing measured inclination value representative thereof, the antenna having a phase center and the satellite navigation system measuring the position of the antenna's phase center and providing measured coordinates therefor within the coordinate system, the computer program product comprising:

a computer-readable medium;

a first set of instructions embodied on the computer-readable medium which directs the data processor to obtain a length r which is representative of a distance from the pivot point to a point on the antenna;

a second set of instructions embodied on the computer-readable medium which directs the data processor to obtain a number N of one or more measurement sets, each measurement set comprising a set of one or more measured antenna coordinates which are representative of the measured position of the antenna's phase center within the coordinate system, and further comprising a corresponding measured inclination value representative of the inclination angle provided by the tilt sensor;

a third set of instructions embodied on the computer-readable medium which directs the data processor to generate an estimate for at least one of the coordinates of the pivot point from the plurality of measurement sets; and a fourth set of instructions embodied on the computer-readable medium which directs the data processing system to provide the estimate for the at least one of the coordinates of the pivot point as an estimate for at least one of the coordinates of the target point.

60. The method of claim 59 wherein the data processor comprises a first input port coupled to an output of the tilt sensor to receive the sensor's measured pole inclination value, and a second input port coupled to an output of the satellite navigation system to receive the sensor's measured pole inclination value;

wherein the second set of instructions includes a first group of instructions which directs the data processor to determine when a set of measured antenna coordinates are provided on the second port and a second group of instructions which directs the data processor to read the antenna coordinates from the second port and the inclination value from the first port at substantially the same time.

* * * * *

UNITED STATES PATENT AND TRADEMARK OFFICE
CERTIFICATE OF CORRECTION

PATENT NO. : 6,633,256 B2
DATED : October 14, 2003
INVENTOR(S) : Zhdanov et al.

It is certified that error appears in the above-identified patent and that said Letters Patent is hereby corrected as shown below:

Column 24,
Line 3, after "having" insert -- a --.
Line 66, delete "measure" and insert therefor -- measured --.

Column 25,
Line 18, delete "measure" and insert therefor -- measured --.
Line 21, after "coordinates" insert -- and --.
Line 37, delete "satellites" and insert therefor -- satellite's --.
Lines 49 and 63, delete the second instance of "that" and insert therefor -- than --.

Column 26,
Line 1, before "pivot" insert -- a --.
Line 61, delete "less that" and insert therefor -- less than --.

Column 27,
Line 7, delete "that" and insert therefor -- than --.
Line 28, after "to" insert -- the --.

Column 28,
Line 6, delete "measure" and insert therefor -- measured --.
Line 19, after "coordinates" insert -- and --.
Line 37, after "to" insert -- the --.

Column 29,
Line 30, delete "an" and insert therefor -- a --.

Column 30,
Line 45, after "having" insert -- a --.
Line 60, after "providing" insert -- a --.

Column 31,
Line 8, after "plumb-position" insert -- axis --.

Column 32,
Line 3, delete "measure" and insert therefor -- measured --.
Line 30, after "of" insert -- the --.
Line 41, after "comprises" insert -- a --.

UNITED STATES PATENT AND TRADEMARK OFFICE
CERTIFICATE OF CORRECTION

PATENT NO. : 6,633,256 B2
DATED : October 14, 2003
INVENTOR(S) : Zhdanov et al.

It is certified that error appears in the above-identified patent and that said Letters Patent is hereby corrected as shown below:

Column 33,
Line 6, before "pivot" insert -- a --.
Line 22, after "providing" insert -- a --.
Line 39, after "position" insert -- axis --.
Line 59, after "comprises" insert -- a --.

Column 35,
Line 16, delete "expand" and insert therefor -- expanded --.

Column 36,
Line 28, delete "denoted" and insert therefor -- denotes --.
Line 47, delete "expand" and insert therefor -- expanded --.

Column 37,
Line 34, after "having" insert -- a --.
Line 47, after "providing" insert -- a --.

Signed and Sealed this

Twelfth Day of October, 2004

JON W. DUDAS
*Director of the United States Patent and Trademark Office*